(12) United States Patent
Le et al.

(10) Patent No.: US 10,243,651 B1
(45) Date of Patent: Mar. 26, 2019

(54) MESH SATELLITE TERMINAL ACCESSING MULTIPLE TIME DIVISION CARRIERS

(71) Applicant: VT IDIRECT, INC., Herndon, VA (US)

(72) Inventors: Ninh Le, Leesburg, VA (US); Maruthi Ram Vinjamuri, Aldie, VA (US); Aravind Ganugapeta, Ashburn, VA (US); Bryan Costello, Oakwood, GA (US)

(73) Assignee: VT iDirect, Inc., Herndon, VA (US)

( * ) Notice: Subject to any disclaimer, the term of this patent is extended or adjusted under 35 U.S.C. 154(b) by 0 days.

(21) Appl. No.: 15/873,345

(22) Filed: Jan. 17, 2018

(51) Int. Cl.
*H04B 7/185* (2006.01)
*H04W 84/06* (2009.01)
*H04B 7/204* (2006.01)

(52) U.S. Cl.
CPC ..... *H04B 7/18528* (2013.01); *H04B 7/18543* (2013.01); *H04B 7/18582* (2013.01); *H04B 7/18584* (2013.01); *H04B 7/18513* (2013.01); *H04B 7/2041* (2013.01); *H04W 84/06* (2013.01)

(58) Field of Classification Search
None
See application file for complete search history.

(56) References Cited

U.S. PATENT DOCUMENTS

| | | | |
|---|---|---|---|
| 4,888,769 A | 12/1989 | Deal | |
| 5,272,446 A | 12/1993 | Chalmers et al. | |
| 8,346,162 B1 | 1/2013 | Jayasimha et al. | |
| 2002/0154620 A1 | 10/2002 | Azenkot et al. | |
| 2004/0246891 A1 | 12/2004 | Kay et al. | |
| 2006/0050660 A1* | 3/2006 | Wells | H04B 7/18582 370/316 |
| 2007/0127608 A1 | 6/2007 | Scheim et al. | |
| 2009/0291658 A1* | 11/2009 | Castle | H04B 1/1638 455/255 |
| 2010/0034136 A1* | 2/2010 | Brener | H04B 7/18584 370/321 |
| 2013/0279512 A1* | 10/2013 | Fung | F21V 33/0052 370/406 |
| 2015/0207559 A1 | 7/2015 | Ryu et al. | |
| 2016/0285659 A1 | 9/2016 | Qi et al. | |
| 2017/0353231 A1 | 12/2017 | Amundsen | |
| 2018/0146443 A1* | 5/2018 | Park | H04L 43/0864 |

OTHER PUBLICATIONS

International Search Report and Written Opinion dated Sep. 13, 2018 in PCT/US2018/038447, 12 pages.

\* cited by examiner

*Primary Examiner* — Mohammed Rachedine
(74) *Attorney, Agent, or Firm* — Oblon, McClelland, Maier & Neustadt, L.L.P.

(57) ABSTRACT

A mesh receiver, computer readable storage medium and method for a very small aperture terminal (VSAT) performing communications in a satellite-based network. The mesh receiver includes a receiver that receives a plurality of TDMA mesh carriers simultaneously in the network in plural channels. The mesh carriers have a transmitted frequency, transmitted gain, and transmitted timing that is unknown to the mesh receiver. The mesh receiver also includes circuitry configured to blindly derive gain, frequency, and timing values from the received mesh carriers, and a demodulator that demodulates the received TDMA mesh carriers and generates demodulated bursts for packets of the communications based on the blindly derived gain, frequency, and timing values.

39 Claims, 14 Drawing Sheets

MESH SATELLITE TERMINAL ACCESSING MULTIPLE TIME DIVISION CARRIERS

FIELD OF DISCLOSURE

The present disclosure relates generally to a remote user terminal that operates in a satellite based IP network both as a star topology and mesh topology, and in particular a remote user terminal that can communicate directly with other remote user terminals in a mesh topology as well as using a hub as a gateway in a multiple access very small aperture terminal in a star topology.

BACKGROUND

A multiple access very small aperture terminal (VSAT) is a satellite ground terminal for a satellite network. A VSAT can perform Internet communication through the satellite network, which uses a star topology in which a subscriber base of remote user terminals all communicate by way of a centralized hub. The hub is used as a gateway that a VSAT goes through to access all other terminals. The hub maintains a master time reference so that the transmissions of all remote user terminals can be synchronized in a non-interfering manner.

A mesh topology is a network arrangement in which remote user terminals transmit a signal directly to another user terminal, via the satellite, in a way that does not require the signal to first be received by a centralized hub. Accordingly, in a mesh network, a VSAT may not have access to the master time reference maintained in the hub. The multiple access nature of VSAT requires synchronized and non-interfering transmission.

In particular, the time synchronization process in a star topology VSAT network uses time-division multiple access (TDMA) for interaction between remote terminals and the centralized hub (transmitters and receiver). The master time reference that is maintained at the hub is broadcast to the remote terminals. Since each remote terminal is located at a different distance (and therefore time delay) from the hub than any other, it must time it's transmissions differently than other remote terminals to ensure its transmissions arrive at the hub without interfering with any other remote terminal's transmissions. As such, the master time reference is synchronized to have a unique solution at each remote terminal. That is, the hub interacts with each remote terminal so that each remote terminal can determine its own unique solution. Each terminal determines its unique solution by obtaining a "copy" of the hub master time reference and offsetting the copy by the time it takes to transmit a signal from the remote terminal to the hub.

There are situations where it would be beneficial for remote terminals that are configured to communicate in a star VSAT network to conduct direct communications without going through the hub. For example, off shore drilling sites with latency sensitive applications like Voice over IP (VoIP) running among those sites may prefer to directly communicate with each other instead of relaying their transmissions through a hub. In such case, the remote terminals configured for a star VSAT network would require a capability to operate both as star and mesh remote user terminals.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof may be readily obtained as the same becomes better understood by reference to the following detailed description when considered in connection with the accompanying drawings, wherein.

DETAILED DESCRIPTION

Figure 1:
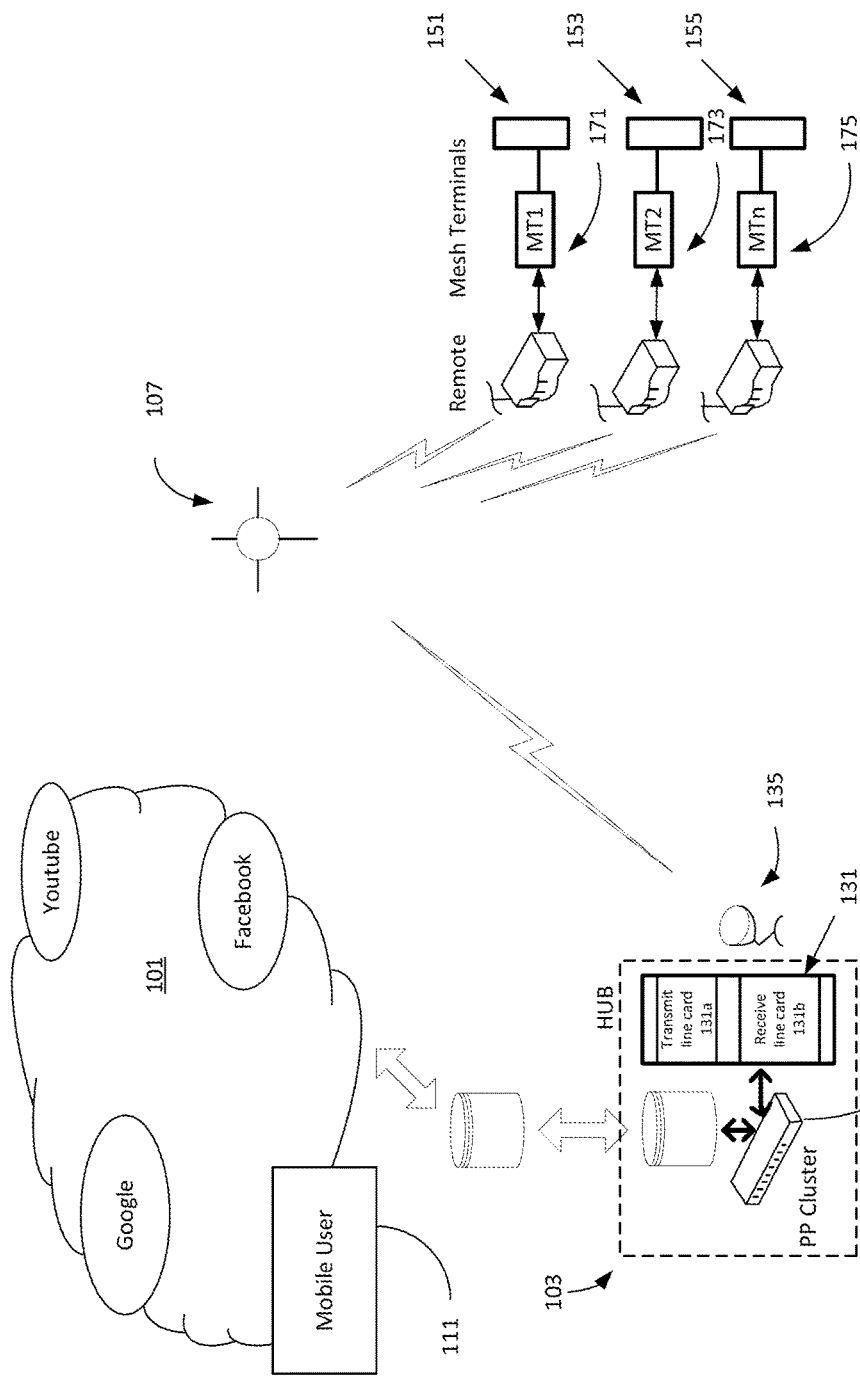
FIG. 1 is a schematic that illustrates a multiple access VSAT system according to an exemplary aspect of the disclosure.

Referring now to the drawings, wherein like reference numerals designate identical or corresponding parts throughout several views, the following description relates to a very small aperture terminal (VSAT) for a satellite based IP network that can support both a star topology in which each VSAT station communicates by way of a central hub that maintains a reference clock, and a mesh topology in which a terminal can directly communicate with another VSAT station by way of a blindly derived timing synchronization. With the star topology the one-way traffic between the network's two remote VSAT stations would require two hops over the air: from the source station to the hub via satellite and from the hub to the destination station via satellite. Mesh topology eliminates the additional hop and allows the two stations to communicate via satellite. That is, the traffic would go from source station to the destination station directly via satellite in a single hop.

Disclosed are functions of various network devices that are part of a mesh network and how packets are handled in the mesh network. Inbound TDMA carriers are configured in a mesh network as the carriers on which the remotes will transmit their data. These carriers have transmit opportunities divided into time slots which are allocated to specific remote terminals in the network. The time slots are allocated based on demand requests from the remote terminals The star-mesh network of the disclosure can handle various traffic types, including: UDP/RTP (Star), TCP (Star), mesh UDP (Mesh), mesh TCP (Mesh), mesh ICMP (Mesh), IGMP (Star), multicast video stream (Star), mesh traffic in mesh failover (Star), and terminal management traffic (Star).

In this disclosure, several short hands or acronyms may be used interchangeably with terms.

Some Examples Include:
Tx: transmission, transmitting.
Rx: reception; receiving.
Sync: synchronization, synchronizing.
Msg: message.
Demod: demodulator.
Freq: frequency
IF: Intermediate Frequency
CRC: Cyclic Redundancy Check.
IP: Internet Protocol.
RMT: remote mesh terminal.
SAT: satellite.
LC: line card.
PSK: Phase Shift Keying.

For a VSAT station operating in a star topology, a master time reference is maintained at the hub and is broadcasted to the many stations. Since each station is at a location that has a different time delay to the hub than any other, it must time its transmissions differently than other stations to ensure its transmissions arrive at the hub without interfering with any other station's transmissions. As such, each station uses a unique synchronized time reference. In the case of a mesh topology, for mesh transmissions that exist within the timing architecture of a star VSAT network, a VSAT station must be able to determine a master time reference for receiving transmissions from other VSAT stations. In this disclosure, a star VSAT network that supports mesh transmissions is referred to as a star-mesh network. Since all VSAT stations need to transmit at the time reference established by the hub in order to not interfere with each other, each VSAT station must determine its own master time reference that is equivalent to the hub master time reference, offset by the time difference between them.

FIG. 1 is a schematic that illustrates a star-mesh network topology according to an exemplary aspect of the disclosure. The network includes a Hub 103 that is a central point of communication with the Internet 101, or other external network. The network further includes one or more VSAT stations for end user communication over the network. The hub 103 communicates with the VSAT stations via satellite 107. The Internet 101 may include one or more mobile users 111 which can communicate with the VSAT network using the Internet 101.

In an embodiment wherein a VSAT network includes one or more VSAT stations, the VSAT stations include one or more remote devices 151, 153, 155 having remote terminals (MT1, MT2, MT3) 171, 173, 175 that are capable of mesh communications. It should be understood that although the drawing in FIG. 1 shows three remote devices, there may be many more remote devices depending on the number of sites. In one embodiment, a remote terminal and a remote device may be a single consolidated device. In one embodiment, a Protocol Processor (PP Cluster) 133 is incorporated in the Hub 103 and the Hub 103 includes one or more hub line cards 131. In one embodiment, the Hub Line Cards 131 and Protocol Processor 133 may be interconnected by Ethernet LAN and may be connected to the Satellite equipment using RF cables to the RF equipment 135. A Network Management system infrastructure that is responsible for configuring and monitoring the network may be co-located in the Hub 103 along with the Protocol Processor 133. In other embodiments, functions of a protocol processor incorporated in the hub may be performed in the one or more remote terminals 171, 173, 175.

Remote devices 151, 153, 155 that are configured to participate in a network, receive the DVB-S2 downstream carrier designated for the network and transmit upstream to the Hub using TDMA upstream carriers. In order to participate in mesh topology a remote device needs to not only transmit data over the TDMA carriers but also receive data over the TDMA carriers to receive data directly from other remote devices in the same network. In an embodiment, the capability of receiving data over the TDMA carriers is provided in the remote terminals 171, 173, 175.

Inbound TDMA carriers that are configured in a VSAT network are referred to as inroute carriers in this disclosure. These inroute carriers are the carriers on which the remote terminals may transmit their data. These inroute carriers may have transmit opportunities divided into time slots and they may be allocated to specific remote terminals in network. The time slots are allocated based on demand request from the remote terminals. In this disclosure, an inroute group is a set of TDMA carriers among which remote terminals can frequency hop their data transmissions in real time. In an exemplary aspect, the TDMA carriers defined in an inroute group shall have the same modulation, coding, and symbol rate; differing from each other only in that their center frequencies are different.

Hub Line Cards

The Hub 103 may house one or more hub line cards 131. An exemplary aspect of the disclosure is two different types of hub line cards that are used for star and mesh network topologies, a transmit line card 131a and a receive line card 131b. The transmit line cards at the hub are agnostic to the mesh networks. The receive line cards 131b at the hub are for communication via a Star topology. A universal line card (ULC-R), also referred to as Multi-channel Demodulator (MCD), at each of the Mesh Terminals has comparable functionality to that included in the receive line card 131b at the hub.

Mesh Remote Terminal

Figure 2:
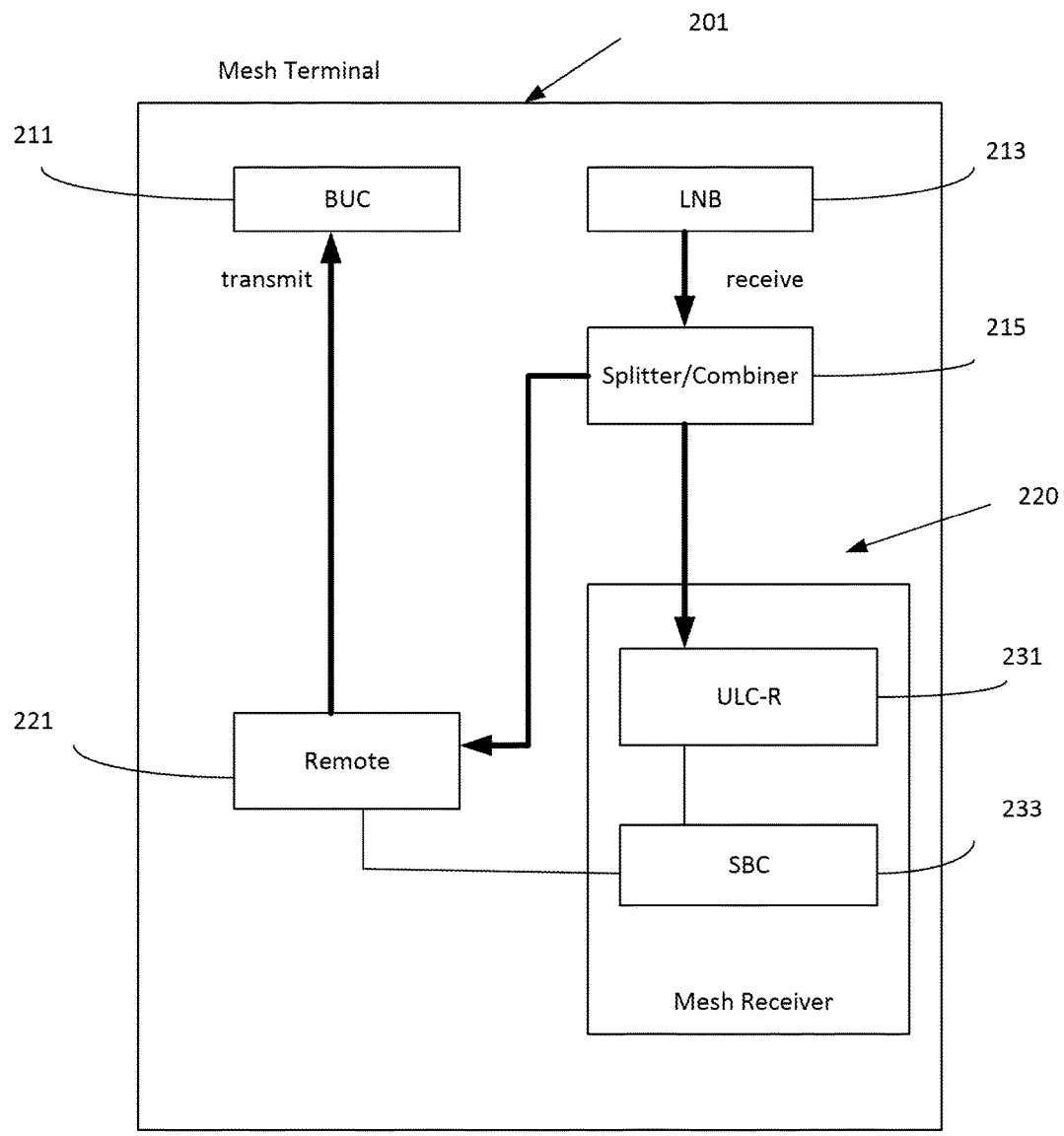
FIG. 2 is a block diagram that illustrates a remote station according to an exemplary aspect of the disclosure.

The mesh remote terminal may be a separate device or a device incorporated in a remote device 151, 153, 155 and provides functions that enable mesh communication in a VSAT station configured for star transmissions. In one embodiment, the mesh remote terminal may include a demodulator that provides TDMA receiving functions in order to enable a star VSAT station to be in a mesh network topology. FIG. 2 is a block diagram of a mesh remote terminal according to an exemplary aspect of the disclosure. To participate in star network transmissions the remote device 221 alone is sufficient. In order to support a star-mesh topology, in addition to the remote device 221, a ULC-R 231 and single board computer (SBC) 233 must be added. In an exemplary aspect, the ULC-R 231 and SBC 233 may be packaged together in a single device and in this disclosure are referred to as Mesh Receiver 220. However, in another embodiment, the combination of the remote device 221, SBC 233 and ULC-R 231 at each station may be packaged together as a single remote device for a star-mesh network. FIG. 2 shows that the connection to a local LAN may be via the remote device 221, but the connection to a local LAN may also be via the SBC 233. The downstream DVB-S2 carrier and all TDMA carriers are received as RF signals in a Low Noise Block (LNB) 213. The splitter 215 sends one copy of these RF signals to the remote 221. The remote 221 demodulates the DVB-S2 carrier to extract IP packets sent downstream from the hub. The splitter 215 sends another copy of the same RF signals to the ULC-R 231. The ULC-R 231 demodulates the TDMA carriers to extract IP packets sent from all the remote sites in the VSAT network. The remote device 221 can transmit IP packets in TDMA bursts via a Block Up Converter (BUC) 211.

The ULC-R 231 that demodulates TDMA carriers having IP packets sent from all, or almost all, the remote sites in the VSAT network allows transmit speed to be decoupled from aggregate receive speed. In particular, some remote sites may receive much more mesh IP throughput than they transmit. Also, other remote sites may transmit much more mesh IP throughput than they receive. A mesh remote that can demodulate only one mesh carrier at a time requires that mesh receive speed to be coupled to the mesh transmit speed. In contrast, because Mesh Receiver 200 can demodulate all mesh carriers simultaneously, the mesh receive speed is decoupled from the mesh transmit speed.

Transmitting higher speeds requires remote sites to have larger antennas and power amplifiers, making those remote sites more expensive. Also, a remote site that is limited to receiving only one mesh carrier at a time involves a hidden extra cost for receiving higher IP throughput in aggregate. This is because the transmissions which any remote receives come from many other mesh VSATs at the same time, not just one mesh VSAT at a time. Also, a Mesh Receiver that only demodulates one mesh carrier at a time must aggregate all incoming transmissions into one relatively large mesh carrier. In contrast, there is no extra cost to receive higher IP throughput when a remote site can demodulate all mesh carriers simultaneously. Also, Mesh Receiver 220 can demodulate all mesh carriers simultaneously and can separate incoming transmissions onto separate carriers, which enables each carrier to be relatively small.

For example, if the receiving mesh site can only demodulate one mesh carrier at a time, when one mesh site receives 1 Mbps from each of 10 other mesh sites, the one mesh carrier sent to the receiving mesh site would have to operate at 10 Mbps. In this case, each of the 10 transmitting remotes would have a 10% time share of the one 10 Mbps mesh carrier. Also, each of the 10 transmitting remotes would have to size its antenna and power amplifier large enough to uplink a 10 Mbps mesh carrier. Large antennas and power amplifiers cost much more than small ones do. 90% of the uplink power in those larger antennas and power amplifiers goes to waste if a mesh remote can only demodulate one mesh carrier at a time. In contrast, the Mesh Receiver 220 avoids this waste. In particular, if one mesh remote receives 1 Mbps from each of 10 other mesh remotes, each of the 10 transmitting remotes needs to transmit only 1 Mbps if the receiving mesh site can demodulate all mesh carriers simultaneously.

In an exemplary aspect, the SBC 233 may be powerful enough to be directly connected to a LAN, and the SBC 233 may perform any necessary routing functions. In this architecture, the remote device 221 may be any star topology VSAT. In an exemplary aspect of the present disclosure, the mesh remote terminal 201 includes the remote device 221 and the SBC 233 connected externally via Ethernet. The ULC-R 231 may communicate with the SBC 233 and be internally connected to the SBC. In an exemplary aspect, the SBC 233 and ULC-R 231 may be designed to use specific IP addresses.

In an exemplary aspect, the remote device 221 is based on a multi-core processor and associated hardware. In an exemplary aspect, the multi-core processor uses an operating system that is based on UNIX. The SBC 233 also may include a multi-core processor and associated hardware. Also, the multi-core processor may use an operating system that is based on UNIX. It should be understood that the term hardware is used to mean electrical circuitry. In addition, a typical configuration of a computer hardware platform that may be used as a SBC 233 is described later.

In an exemplary aspect, the Universal Line Card for receiving (ULC-R) 231 may be configured to demodulate up to 16 TDMA carriers as a mesh receiver. In one embodiment, all mesh remote sites in a VSAT network have a ULC-R 231 that includes a 16 channel demodulator. The ULC-R 221 demodulates the TDMA carriers and sends the assembled bursts to the SBC 233. The SBC 233 assembles the IP packets from the bursts and forwards the traffic to the remote device 221, which in turn forwards the traffic to its destination.

The ULC-R 231 may be configured to receive messages regarding mesh network communications. In one embodiment, the ULC-R 231 transmits a mesh synchronizing timing offset message, a mesh synchronizing frequency offset message, a mesh gain message, and a mesh demodulation monitor message. The ULC-R 231 accepts the mesh synchronizing timing offset message from the SBC 233 and adjusts Start of Frame (SOF) delay based on the timing offset received in the message. The mesh gain message is a message that is received from the SBC 233 for programming the gain value in the message on all active channels on the ULC-R. The mesh gain message is for setting a gain value of the amplifier in the demodulator to an initial value. The mesh demodulation monitor message is a monitoring message that may be sent periodically to the SBC 233 in order to report functioning of the ULC-R.

In one embodiment, the ULC-R 231 can handle the following messages:

a. MeshRxSyncTimeOffsetMsg—Correct the time offset in both mesh acquisition and tracking.
b. MeshRxSyncFreqOffsetMsg—Correct the frequency offset in tracking.
c. MeshRxGainMsg—Set the initial loop gain while acquisition.
d. MeshDemodMonitorMsg—This is a monitoring message that ULCR send periodically (default 1 second frequency) to SBC.

For mesh transmission, the demodulator needs to adjust its center frequency because of its local LNB instability and instability of the local on-board oscillator. The center frequency is adjusted based on the frequency offset received in the mesh synchronizing frequency offset message. In particular, a center frequency of a tuner in the demodulator is determined that meets predetermined signal conditions, including no CRC errors in a received channel.

Figure 3:
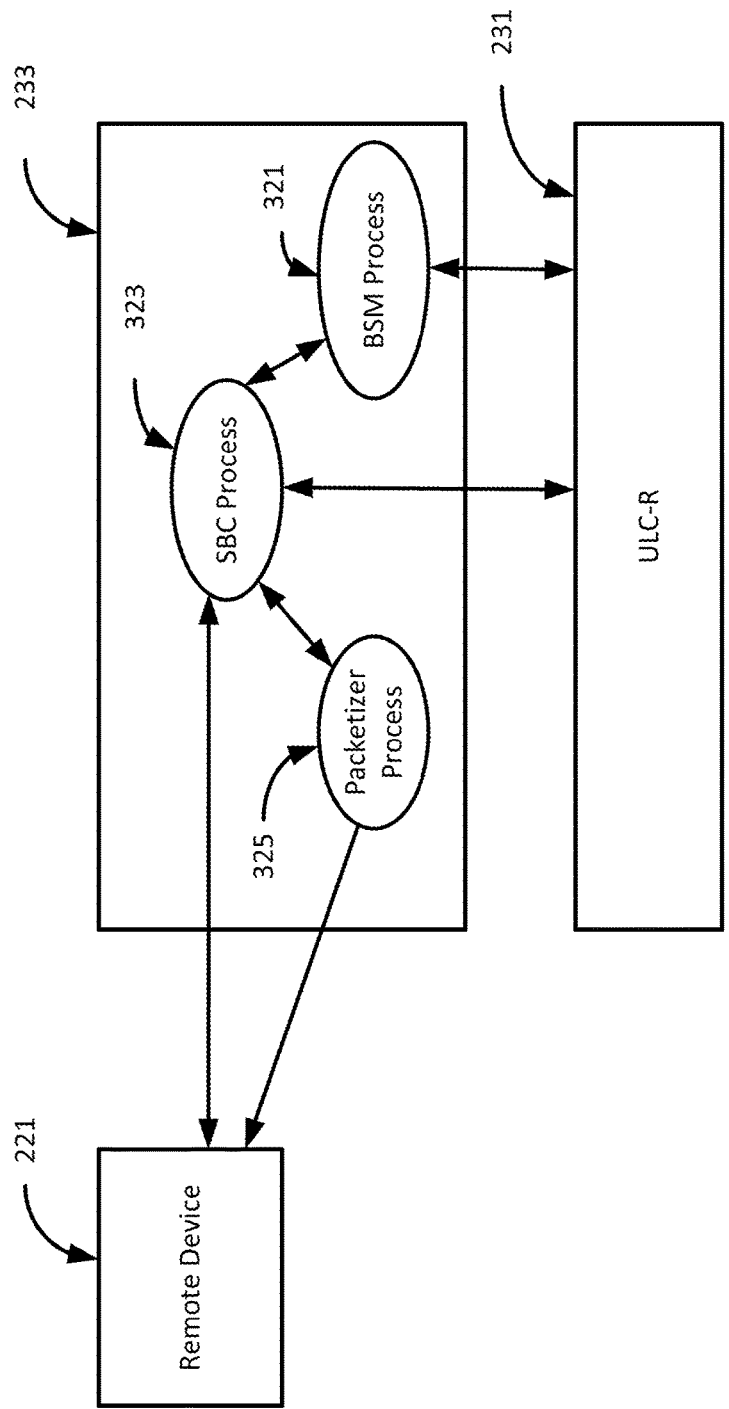
FIG. 3 is a block diagram illustrating processes performed in a single board computer (SBC) according to an exemplary aspect of the disclosure.

In one embodiment, the SBC 233 may perform various processes that enable direct synchronized reception of channels from remote terminals via a satellite. FIG. 3 is a block diagram illustrating processes performed in an SBC according to an exemplary aspect of the disclosure. The SBC 233 may operate with respect to a remote device 221 and ULC-R 231. The remote device 221 is a device for star network communications as a VSAT station. The ULC-R 231 is a receiving card for receiving mesh transmission over multiple carriers. In one embodiment, the SBC board 233 may contain one or more processors and local memory for storing computer program code for performing the various processes. Among the various processes, the SBC board 233 may include an SBC process 323, a packetizer process 325, and a blind synchronization process 321.

The SBC process 323 provides interfaces for communications within the SBC board as well as between the SBC board and external components. For communications external to the SBC board, the SBC process 323 provides an interface with the remote device 221. In an exemplary aspect, the remote device 221 uses UDP sockets to communicate with the SBC board: one for sending messages to SBC, and another one for receiving messages from SBC. Upon receiving the IGC (Inroute Group Composition) in the DVB-S2 downstream, the remote device will forward the Signaling Information (SI) tables to the SBC board. For communications within the board, the SBC process 323 provides an interface with packetizer process 325 and forwards all the TDMA bursts it received from ULC-R 231 with the trailers for further processing. The SBC process also has an interface to the blind synchronization module (BSM) process 321.

The SBC process 323 communicates with remote device 221 via one of the UDP sockets. The port numbers and the IP addresses may be configurable parameters. In an exemplary aspect, the SBC process 323 is configurable by the network operator.

Blind Synchronization Module Process

A disclosed remote terminal is for mesh communications within a multiple access VSAT system. A multiple access VSAT system inherently uses a star architecture where a subscriber base of remote user terminals all communicate directly with a centralized hub, using the hub as a gateway to all other destinations for traffic flow. The multiple access nature of the VSAT system requires the hub to maintain a master time reference so that the transmissions of all remote user terminals can be synchronized in a non-interfering manner. On the other hand, mesh architectures by definition require that remote user terminals communicate directly with each other, an architecture quite different from the star architecture.

The synchronization by a centralized hub terminal to ensure transmissions from remote user terminals do not interfere with each other is accomplished by maintaining a master time reference at the hub terminal and broadcasting this to the many remotes. Since each remote is located at a different distance (and therefore time delay) from the hub than any other, it must time it's transmissions differently than other remotes to ensure its transmissions arrive at the hub without interfering with any other remote's transmissions. As such, the synchronized time reference has a unique solution at each remote. The hub interacts with each remote so that each remote can determine its own unique solution. This unique solution is a "copy" of the hub master time reference that is offset by the time it takes to transmit a signal from the remote to the hub.

The aforementioned time synchronization process is well known for application in TDMA radio networks and has many unique implementation solutions that all involve interaction between remote terminals and a centralized hub (transmitters and receiver). For mesh transmissions that exist within the timing architecture of a star VSAT network, the mesh receiver must also determine a master time reference for receiving transmissions from mesh transmitters. Since all mesh transmitters need to transmit at the time reference established by the hub in order to not interfere with each other, each mesh receiver must acquire its own master time reference that is equivalent in function to the hub master time reference, offset by the time difference between them. The disclosed remote terminal employs an algorithm for receiving star and mesh transmissions and blindly derives a master time reference from these transmissions, which is referred to as Blind Synchronization.

In one embodiment, an unsynchronized mesh receiver of a remote terminal may blindly receive mesh and star transmissions based on approximate a priori information, and derive the proper frequency, time, and gain information to drive a demodulator to receive multiple channels. Blind synchronization operates independently of any feedback information derived from a closed loop interaction between a transmitter and receiver.

The Blind Synchronization Module (BSM) Process 321 interfaces with the SBC process 323 and the ULC-R 231.

One ULC-R serves as a multi-channel TDMA demodulator in each Mesh Receiver. The remote device can configure, initialize, and enable firmware in the ULC-R of a Mesh Receiver to lock onto TDMA signals downlinked from a satellite. Unlike ULC-R line cards at the hub, which get their clock from a backplane, any ULC-R in a Mesh Receiver must work with an internal clock.

Frequency Offset Correction, Time Offset Correction and Gain Messages

At the hub of the VSAT network, all ULC-R hub line cards receive a pulse per second (PPS) and a 10 MHz reference clock as inputs from a backplane. The PPS trigger is used to generate the 16 receive start of frame (Rx_SOF) signals used to demodulate the TDMA carriers in the inroute group. The same PPS and 10 MHz are used as the reference for the entire TDMA VSAT system. So, the same signals go the transmit hub line card as well. The network clock reference (NCR) messages sent downstream on the DVB-S2 carrier use the same 10 MHz clock for NCR time in the NCR messages that are sent out from the hub to the remotes. So, by design, the ULC-R cards at the hub stay in sync with the master NCR time and can use the NCR time in the SI tables for demodulation at the hub. In contrast, the ULC-R in the Mesh Receiver cannot use the hub's PPS and 10 MHz reference because the hub's PPS and 10 MHz are not co-located at the remote site. When the Mesh Receiver lacks the circuitry to recover the hub's PPS and 10 MHz from the NCR messages which the hub broadcasts to all remote sites, the ULC-R in the Mesh Receiver must instead use its 20 MHz onboard clock as a reference for all the firmware blocks. At each remote mesh terminal (RMT), the Rx_SOF signal internally generated on the remote's ULC-R must be aligned with the true Rx_SOF at the hub, and that alignment must continue to be maintained after its initial acquisition. To achieve this functionality, some changes in the software and firmware at the RMT needs to be made. These changes make the software and firmware running on a remote's ULC-R slightly different from the software and firmware running on any ULC-R located at the hub. The first difference is that the remote's ULC-R software accepts a MeshRxSyncTimeOffsetMsg from the remote's SBC and adjusts the sof_delay based on the time offset received in that message. For this to happen, the remote's firmware needs to honor the sof_delay change on a frame by frame basis. A second difference lies in how input amplifier gain is determined for the ULC-R. In the ULC-R at the hub, there is a software gain sweep logic that is enabled by default. This gain sweep is needed during the initial acquisition of remote terminals, when no remote is in the network. This gain sweep runs at a much faster pace than that which is needed on the Mesh Receiver. So, on a Mesh Receiver, the default software gain sweep is disabled. To control gain externally in a Mesh Receiver, the remote's ULC-R software is modified to accept a new message (MeshRxGainMsg) from the SBC. At each remote, the ULC-R's software programs the gain value from this new message on all the active channels in the ULC-R. The third difference between hub versus remote ULC-R lies in how they achieve frequency stability. In the ULC-R at the hub, there is no need to adjust any center frequency because all remote modulators are adjusted in frequency, power, and time using the Uplink Control Process (UCP) algorithm to align with the hub. However, the ULC-R in the Mesh Receiver needs to adjust its receive center frequency based on the frequency offset it experiences due to instability in the remote's local LNB and instability in the local onboard oscillator. Unlike at the hub, the ULC-R at each remote must accept a new message from the SBC (MeshRxSyncFreqOffsetMsg) and write the frequency offset from this message to the ULC-R's firmware register.

Packetizer Process

Packetizer process 325 interacts with SBC Process 323 and forwards the data traffic directly to remote device 221 using UDP sockets. Packetizer 325 interfaces with SBC process 323 using Unix domain sockets to receive TDMA Bursts. Packetizer 325 receives the High-level Data Link Control (HDLC) information from the SBC process. Packetizer 325 filters the received TDMA Bursts based on the destination HDLC field in the Link Layer Header.

Packetizer 325 aggregates the TDMA bursts into IP packets. After filtering out the packets not addressed to its specific remote site, the Packetizer 325 then forwards the remaining packets to the Remote Device 221 for routing to the LAN(s) at its specific remote site. Packetizer Process 325 may receive the bursts from the SBC Process 323 and inspect the TDMA trailer. If (1) there are no CRC errors and (2) the payload is a mesh burst and (3) the burst is destined to this mesh terminal (that is, the burst's destination HDLC matches the HDLC address of this mesh terminal), then the Packetizer Process 325 may send the burst up the stack for further processing. The various layers of the stack may then process the burst and (if necessary) assemble an IP packet from multiple bursts if the IP packet spans more than one burst. The stack then forwards the IP packet(s) to Remote Device 221 via a separate UDP datagram socket.

In a star network topology, a multitude of remote terminals communicate back to a centralized hub terminal that maintains master network time reference. In Multi-frequency, time division multiple access (MF-TDMA) VSAT networks, the traffic carrying capacity of the network is shared by the remote terminals by using multiple carriers at different frequencies, each being time shared by many (if not all) the remote terminals in the network. This requirement, coupled with the necessary master timing signals needed for synchronization, amounts to electronics that is typically large in size, weight, and power consumption.

In a star topology network, all remote terminals only need to receive one broadcast carrier from the hub terminal. And each remote needs to transmit on only one return carrier at any given time. However, in a mesh topology where each mesh terminal is capable of communicating directly with many other mesh terminals simultaneously, the capability to use multiple demodulators for simultaneously receiving from many other mesh terminals is needed to maximize a remote's mesh receive capacity. The ULC-R 231 maximizes mesh receive capacity because it is a multi-channel demodulator (MCD). In contrast, other mesh VSAT from other VSAT manufacturers have less mesh receive capacity because those other mesh VSAT receive only one mesh carrier at a time.

Figure 4:
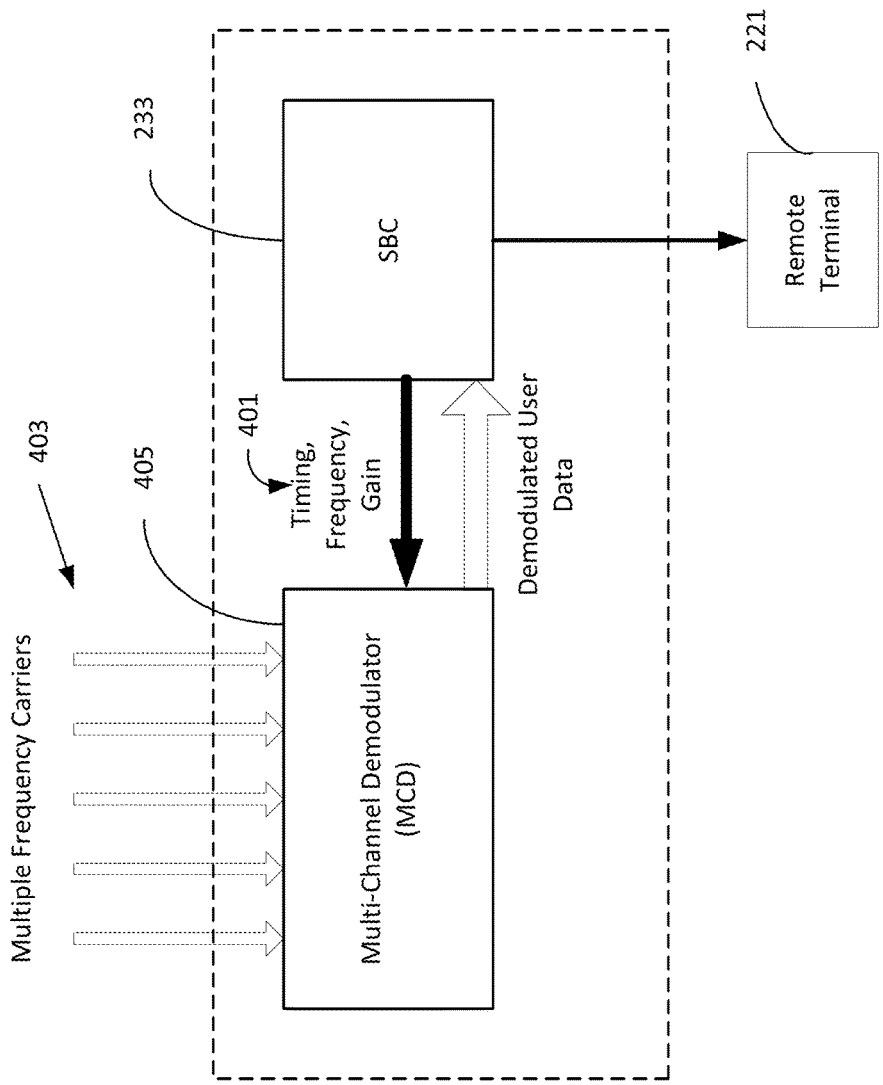
FIG. 4 is a block diagram that illustrates the arrangement of the Multi-channel Demodulator (MCD) according to an exemplary aspect of the disclosure.

FIG. 4 is a block diagram that illustrates the arrangement of the MCD according to an exemplary aspect of the disclosure. In order to handle mesh network capacity, a method for providing the master timing to synchronize the MCD is needed. In an exemplary aspect, the master network timing, frequency, and gain 401 are blindly derived at the remote terminal by the Blind Synchronization Module (BSM) Process 321 in order to synchronize the demodulation of the MF-TDMA carriers 403 by the MCD 405. Once synchronized, the MCD 405 generates demodulated bursts for packets provided by the TDMA carriers.

A typical mesh receiver is designed to receive the transmissions of only one mesh transmitter at any given time. This can severely limit the capacity of a mesh network as the number of mesh terminals grows, or even for mesh networks with small numbers of mesh terminals where a full mesh connectivity is required (where all mesh transmitters can communicate with all mesh receivers). In order to increase both capacity and connectivity, a mesh remote needs to be capable of receiving multiple channels simultaneously. This is accomplished in a mesh receiver solution with a Multi-Channel Demodulator (MCD). An exemplary aspect of the disclosure is a MCD that houses 16 demodulators, a tuner, and amplifier as a shared resource to simultaneously demodulate up to 16 channels. This aspect provides for a remote terminal that has a low form factor and cost while providing increased throughput and connectivity in a single mesh remote terminal.

The combination of the BSM and MCD provide a uniquely small size, weight, and power package that is capable of throughput and connectivity needed to act as a mesh receiver. Another alternative method for accomplishing multiple mesh links may be to have a single carrier of larger capacity that is time shared by all mesh remote terminals. In this way a need for an MCD is bypassed, but the larger single carrier would have to be, e.g., 10 times larger than 10 MF-TDMA carriers of ¹/₁₀ the size in order to achieve the same capacity. As such, the size of the single carrier required becomes very large as the number of mesh remote terminals in the network increases and as inter-connectivity requirements approach that of a full mesh. (A full mesh is defined as all mesh terminals having mesh connectivity to all other mesh terminals.). The larger carrier subsequently requires a much larger high power amplifier (HPA) at every remote mesh terminal (RMT) to realize a solution. Putting a large HPA at every RMT has a considerable cost impact. Thus, multiple frequency carrier mesh remotes with MCDs provide a much more cost effective mesh solution.

Because remote terminals are the most proliferated component in a VSAT network, a driving requirement to their design is that they have a low cost. In addition to this, remotes are often employed in consumer settings where a small form factor (or package size) is required. Finally, to accommodate high numbers of mesh remotes and maximize overall mesh capacity, increasing the mesh remotes' throughput and connectivity capabilities is key. Meeting all three of these driving requirements in a single mesh product—low cost, small form factor, and high throughput/connectivity—is a distinct benefit to any remote design.

Typical mesh network implementations that utilize VSAT system components segregate all mesh traffic from any star traffic, i.e., mesh carriers are separated from star carriers. When VSAT users who have mesh and star throughput requirements use these types of solutions, the number of mesh and star carriers required begin to consume more bandwidth on the satellite than if common carriers could be shared between the mesh and star traffic. This is especially true when the traffic does not load the carriers with a 100% utilization factor. This is the very essence of multiple access networks—the ability to share, on demand, the carriers of a network in an efficient manner such that bursty traffic of individual users can statistically share a carrier to nearly 100% utilization factor. With a proper statistical multiplexing design, this in turn reduces the number of carriers required, reducing the amount of satellite bandwidth required.

The disclosed remote terminal multiplexes the traffic of both mesh and star VSAT traffic onto a common set of carriers, maximizing the statistical multiplexing gain of the hybrid network. In addition to this, the remote terminal provides the flexibility to organize carriers into star-only, mesh-only, and hybrid star-mesh traffic carriers, enabling maximum flexibility in VSAT network design to provide optimal traffic engineering solutions.

Thus, another benefit of using multiple frequency carriers for the mesh network is that these carriers can be the same carriers used in the base star VSAT network. The MF-TDMA carriers are synchronized with the hub as part of the basic star network operation inherent in all VSAT networks. The BSM at each mesh remote enables these same carriers to be used for mesh capacity (see FIG. 4). By time sharing each of the MF-TDMA carriers, both mesh and star traffic can pass over the same carriers. The resource allocation algorithms at the hub assigns the time/frequency slots of the MF-TDMA carriers to either star or mesh traffic on-demand, statistically multiplexing traffic to the resources as needed. In this way, the multiple access sharing of the MF-TDMA carriers is maximized among all traffic—star and mesh—such that the total network bandwidth required for lease on a satellite transponder is minimized, allowing for further cost savings.

Protocol Processor

To support a mesh network, the Protocol Processor 133 (PP cluster) maintains Address Resolution Protocol (ARP) and mesh routing tables. The PP cluster 133 periodically updates the ARP and mesh routing tables on all the remote terminals in a mesh network. The PP cluster 133 may perform functions including allocating bandwidth (in terms of timeslots) to allow remote terminals to transmit data upstream, forwarding data to and from remote terminals via line cards, performing Performance Enhancing Proxy (PEP) functions over the data, and performing uplink power control. In an exemplary aspect, the PP cluster 133 generates a burst time plan for the TDMA carriers without any regard for whether a specific time slot is meant to carry mesh traffic or star topology traffic. Each remote terminal in a mesh network decides for itself to use each of its assigned time slots to transmit a mesh burst or a star topology burst. The PP cluster 133 may create the ARP and mesh routing tables entries based on the heartbeat messages it receives from the mesh terminals that indicate their state.

Additionally, the PP cluster 133 may receive traffic destined for mesh remotes from other mesh remotes via TDMA carriers from the Hub line cards. If the TDMA bursts received include source and destination MAC layer header, then the PP cluster 133 may use the data for uplink power control and drop those packets. If the MAC layer header contains only the source HDLC address, then the PP cluster 133 may perform a route look up and forward the packet to the destination. This allows the PP cluster 133 to forward data traffic when either the source remote or the destination is out of mesh, and allows PP cluster 133 to perform TCP acceleration or other PEP functions as necessary, if the source mesh terminal uses old link layer header for TCP traffic.

In an exemplary aspect, if the Mesh Receiver acquires lock, the SBC sends IN_NETWORK state to remote device in the Hello message that it sends out every 5 seconds. The remote device then updates the status of the modem from IN_NETWORK to IN_MESH and sends the MeshStatus Message to the PP Cluster 133.

In an exemplary aspect, the PP also may add a new mesh routing table and satellite ARP table. The PP may periodically broadcast these two tables on downstream to the remotes. A remote terminal may use these two tables to find the destination HDLC from destination IP address of an IP packet.

The protocol processor may also perform other functions like allocating bandwidth in terms of timeslots to allow remote terminals to transmit data upstream, forwarding data to and from remote terminals via line cards, and performing PEP functions over the data.

In a star topology network, the remote user terminals receive timing information from a centralized hub in the form of a hub master time reference. In a mesh topology network, a mesh receiver operates without any initial knowledge of timing information for the frames in the TDMA signals. Each mesh receiver determines time and frequency corrections for receiving mesh TDMA signals at the physical layer. The following sections describe the treatment of data at various layers of the Internet network stack.

Physical Layer

In order to support the Star topology, the remote terminals may receive the data on DVB-S2 downstream carrier and transmit on the TDMA carriers configured in their inroute group at intervals when their allocated slot intervals occur. To participate in a mesh network, every remote mesh terminal (RMT) is configured to receive all the TDMA carriers that are transmitted by all the mesh terminals in the network. How a mesh terminal determines timing and corrects frequency is described further below.

Data Link Layer

To transmit a TDMA burst via a star topology, a remote terminal includes its source HDLC address in its frame header. A star topology TDMA burst does not need any destination address because the destination of every star topology burst is always the hub.

To transmit a TDMA burst via a mesh topology, the burst's frame header must include the source HDLC address and the destination HDLC address. Together, these two addresses identify the mesh terminals at the ends of a mesh link. In an exemplary aspect, the Media Access Control (MAC) portion of the link layer header for each mesh TDMA frame is as follows:

Destination HDLC:Source HDLC:LL Control Field

For traffic destined to the Hub, the link layer header contains only the source HDLC address. Otherwise, the first bit in the HDLC address identifies if the link layer header contains the source or destination HDLC address. The 1-bit in the MAC Layer header indicates it as destination HDLC address. If the HDLC address has this 1-bit set, then the payload may be a mesh burst. If the first bit in the HDLC address indicates it is the source HDLC, then it is a star burst. In other words, mesh terminals may include source and destination addresses in the link layer headers of TDMA bursts destined for other mesh terminals. But mesh terminals may include only source addresses in the link layer headers of TDMA bursts destined for the Hub or for other remote terminals via the Hub. The Protocol Processor may make a determination on whether to forward the traffic further or not based on the layer 2 header in the received TDMA bursts.

Network Layer

The network layer determines whether or not an IP packet may be forwarded directly via single hop to another mesh terminal or whether the packet may go over the hub (or forwarded via LAN). The mesh terminals first perform route lookup based on the VLAN and destination IP address to find the next hop IP address and forwarding interface. If the packet is destined to go over the air, the mesh remote uses the next hop VLAN and IP address to perform a satellite ARP table look up. If the Satellite ARP table look up yields an HDLC address other than the remote itself, the packet is destined for another mesh terminal. Any such packet is marked as a mesh packet. The Remote Mesh Terminal may then segment the packet into TDMA bursts and attach the MAC Layer header with source and destination link layer addresses before transmitting the Mesh bursts.

The destination mesh terminal may receive the bursts, assemble IP packets, and forward them over its LAN. The Hub line card may also receive these mesh bursts and forward them to the Protocol Processor. The Protocol Processor may use mesh bursts for performing Uplink Power Control (UCP) before dropping these mesh bursts.

The mesh terminals forward the Satellite ARP table and the per VLAN IP routing tables. Every mesh terminal sends a heartbeat message to the Protocol Processor indicating its state. The Protocol Processor builds the mesh routing table as well as the satellite ARP table based on the heartbeat messages it receives from various mesh terminals.

At the physical layer, each Mesh Receiver can receive the TDMA carriers that are transmitted by all other mesh terminals. The multi-channel demodulator initially does not know the start time of the periodic TDMA frame. So, the mesh receiver initially guesses a start time. This start time guess must be made to align with the true start of frame, and the alignment must be maintained after the initial acquisition. Furthermore, the remote mesh terminal must determine the gain of the demodulator, the frequency offset in the receiving path, and the start time of every time slot to get a timing lock on every TDMA burst. The next few paragraphs describe how the blind synchronization module (BSM) process interfaces with the SBC process and the multi-channel demodulator to time lock onto the TDMA frame.

Figure 5:
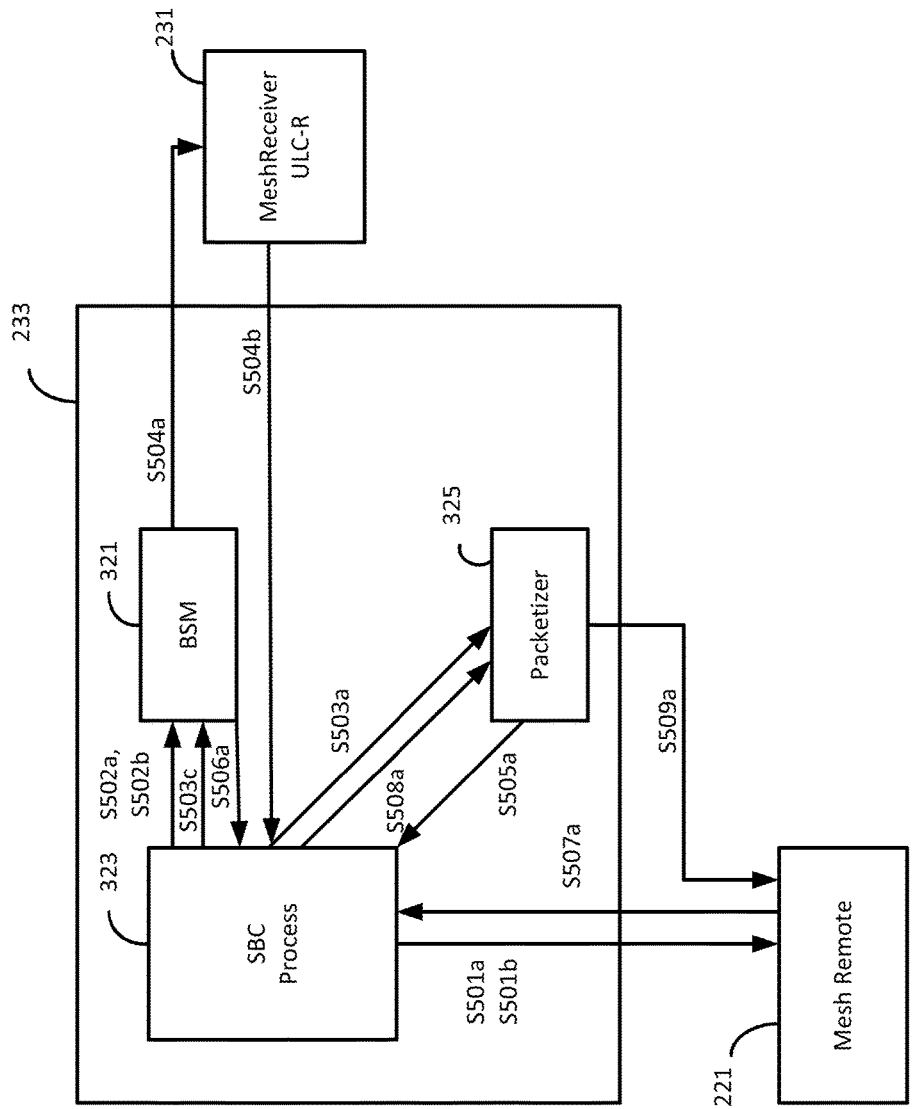
FIG. 5 is a block diagram illustrating the interfaces in the SBC 233 from the perspective of the SBC process, according to an exemplary aspect of the disclosure.

FIG. 5 is a block diagram illustrating the interfaces in the SBC 233 from the perspective of the SBC process, according to an exemplary aspect of the disclosure. The SBC 233 provides a service to manage processes running on the SBC 233. This service follows the same framework as the PP at the hub does. Since this service starts each process using a UNIX upstart script, no separate handling is required for a crash restart. Any crash restart will be done by the UNIX upstart script. Furthermore, the SBC Manager shall handle any hung state process restart.

FIG. 5 shows the various message flows (including both control and data) in the SBC 233. In S501a, the SBC 323 and remote device 221 may exchange Hello messages periodically. The Hello message received from remote device 221 contains primarily the High-level Data Link Control (HDLC) address of remote device 221 and the inroute group ID it is in. Additionally, the remote device 221 also may specify the current state of the Mesh terminal. The SBC 323 sends S502a (the SBC Hello Message ID) to the BSM. Furthermore, the SBC 323 sends S503a to the Packetizer 325. The SBC 323 (in its Hello message S502a) primarily updates the IN Mesh state, which (in S506a) it receives from the BSM process 321. In S504a, the BSM process 321 periodically sends a Tunnel Control Message to the Demodulator 231, along with a Mesh Ident message, a channel map, mesh sync message, Mesh Sync Frequency Offset message, Mesh Gain Message, Tunnel Control SADA_Heartbeat, and SI Tables. In S504b, the Demodulator may respond with the TDMA bursts. Also, the packetizer (in S505a) may respond with a SBC Hello Message. In S506a, the BSM 321 may respond with a SBC Hello message indicating the mesh state. In S507a, the SBC 323 informs the remote device 221 whether or not the terminal is in the mesh state. The SBC 323 may send the same information it received from remote device 221 back, such as information in the HDLC and inroute group ID fields. In S501b, remote device 221 may forward Signaling Information (SI) tables it receives from the Hub to SBC 323. In S508a, the SBC 323 may send the TDMA bursts to the Packetizer 325. In S509a, the Packetizer 325 combines the bursts and sends out IP packets to the remote device 221.

Interface Between SBC and ULC-R

Regarding the interface between the SBC and the ULC-R, SBC 323 may send messages to ULC-R 231 using UDP sockets at well-known ports. SBC 323 may listen on a UDP socket for receiving messages from ULC-R 231. In S504a, SBC 323 may send a channel map message with the IP address and UDP port information as to where the ULC-R 231 can send the TDMA bursts it demodulates.

In S504a, SBC 323 may forward the SI tables updated by blind synchronization module (BSM) process 321, discussed later, to ULC-R 231. ULC-R 231 may use this configuration information in tuning for and demodulating TDMA frames.

Interface Between SBC and Packetizer

Regarding the interface between the SBC and the packetizer, SBC 323 and packetizer 325 may communicate using UNIX Domain sockets to exchange messages. In S503a, SBC 323 may send Hello messages to the packetizer 325 periodically and also, in S505a, receive the Hello messages from the packetizer 325. In these Hello messages, SBC 323 may forward the HDLC address of the Mesh terminal and the inroute group ID.

In S508a, SBC 323 may forward the TDMA bursts it receives from ULC-R 231 to packetizer 325. The packetizer 325 may further process the TDMA bursts and extract IP packets from the bursts.

In S502b, SBC 323 may forward the SI tables it receives from remote device 221 to BSM 321. Since BSM 321 sends updated SI tables back to the SBC Process, these tables are forwarded to the ULC-R 231 by the SBC Process 323. The SBC Process 323 also may forward the trailers from the TDMA bursts to BSM 321.

Figure 6:
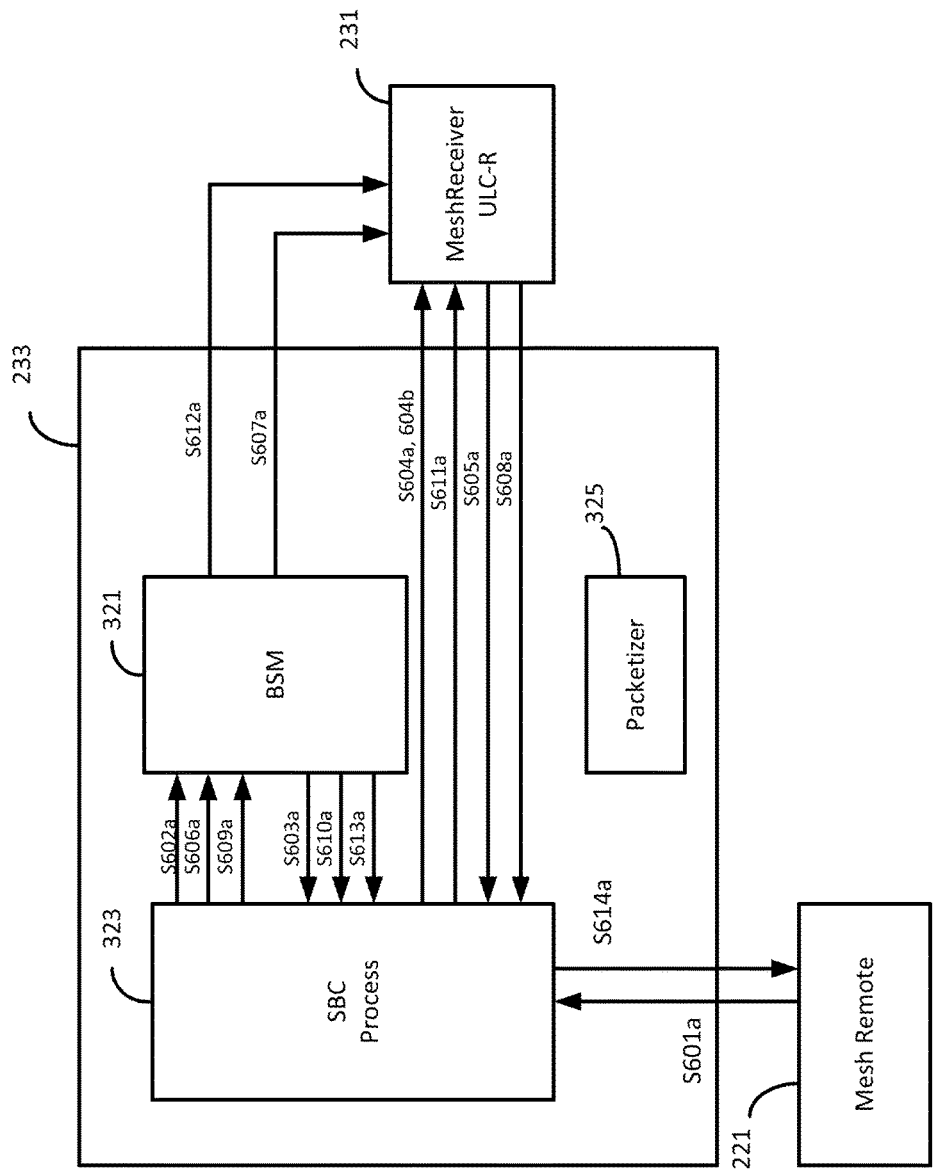
FIG. 6 is a block diagram illustrating the interfaces in the SBC 233 from the perspective of the BSM process 321, according to an exemplary aspect of the disclosure.

In an exemplary aspect, a mesh remote terminal needs to determine a proper gain, frequency, and timing. The gain, frequency offset, and timing offset may be determined initially when the terminal is acquired into the mesh network. Also, to maintain a lock on receiving mesh transmission, the mesh remote terminal needs to adjust timing and frequency. FIG. 6 is a block diagram illustrating the interfaces in the SBC 233 from the perspective of the BSM process 321, according to an exemplary aspect of the disclosure.

The SBC Process 323 and the BSM Process 321 may use UNIX domain sockets to exchange messages. The SBC Process 323 and the BSM Process 321 may send Hello messages to each other periodically. The BSM 321 may determine and maintain whether the terminal is IN MESH or not, and the BSM 321 may forward this information to the SBC Process 323 in the Hello message, which in turn forwards it to the remote device 221.

In particular, in S601a, the SBC 323 may receive the SI table from the mesh remote 221. In S602a, the SBC 323 sends the SI table to the BSM process 321 using UNIX domain sockets. In S603a, the BSM process 321 may send a modified SI Table, which may be used to determine frequency drift for a carrier. In S604a, the BSM 321 may periodically send the modified SI table with a channel configured with a different frequency to the demodulator 231. In S604b, the BSM 321 may also send a mesh gain message to the demodulator 231. In S605a, in the case that a burst comes back as a bad burst (a burst in which the CRC fails), an indication that the burst is bad is sent to the SBC 323. In S606a, the burst header for a bad burst is sent to the BSM 321. In S607a, the BSM 321 periodically sends to the demodulator a mesh sync message containing a timing offset correction. At some point, the timing aligns closely enough and a good burst is detected. In S608a, a message is sent to the SBC 323 that a good burst has been detected. In S609a, a message indicating that a burst header is for a good burst is sent to the BSM 321. In S610a, the BSM 321 responds with a message including an SI Table with the Frequency Offset correction for all configured inroutes. In S611a, this SI Table with Frequency Offset correction is sent to the demodulator 231. In S612a, the BSM 321 sends a mesh sync message with the timing offset, and a mesh sync frequency offset message with a frequency offset to the demodulator 231 for tracking. In S613a, the BSM 321 sends a message to indicate that the demodulator is in mesh. In S614a, this message is forwarded to the mesh remote 221 to notify that the mesh receiver 220 is in mesh.

In an exemplary aspect, the SBC Process 323 may forward the SI tables it receives from remote device 221 to BSM 321. Since BSM 321 sends updated SI tables back to the SBC Process 323, these tables are forwarded to the ULC-R 231 by the SBC Process 323. The SBC Process 323 also may forward the trailers from the TDMA bursts to BSM 321 using UNIX domain sockets.

In an exemplary aspect, the BSM 321 may interface with ULC-R 231 using UDP sockets to send MeshRxSyncTimeOffsetMsg, MeshRxGainMsg and MeshRxSyncFreqOffsetMsg.

In one embodiment, the BSM 321 may determine the frequency offset in its receive path during mesh acquisition by generating SI tables using only one carrier from the inroute group by altering the center frequency offset of that carrier at various frequency step sizes.

In an exemplary aspect, the BSM 321 may adjust the original SI tables with the frequency offset determined after an initial frequency sweep.

In one embodiment, the BSM 321 may send the MeshRxSyncTimeOffsetMsg to ULC-R at the end of every frame to adjust the Rx_SOF to acquire Frame lock on the ULC-R and also for tracking the Rx_SOF.

The BSM 321 may send the MeshRxGainMsg to ULC-R 231 to alter the gain programmed per channel.

The BSM 321 may send the MeshRxSyncFreqOffsetMsg to ULC-R 231 to adjust for the frequency drift observed using the Frequency Offset (FO) from the TDMA burst trailer.

When the ULC-R locks to TDMA carriers, BSM 321 may determine if the mesh terminal is in mesh network or not.

Once the determination is made, the BSM 321 forwards the state information to the SBC Process 323 as part of the Hello message. The SBC Process 323 may then send the mesh state to the remote device 221. The remote device 221 may then update its mesh state to be IN MESH and send a mesh state message. The mesh state message is also referred to as a heartbeat message. If at any time the ULC-R loses the lock on the TDMA carrier, it updates its status to the SBC Process 323, and the SBC Process 323 may send its mesh state message to the remote device 221. The remote device 221 may then appropriately update its state.

Figure 7:
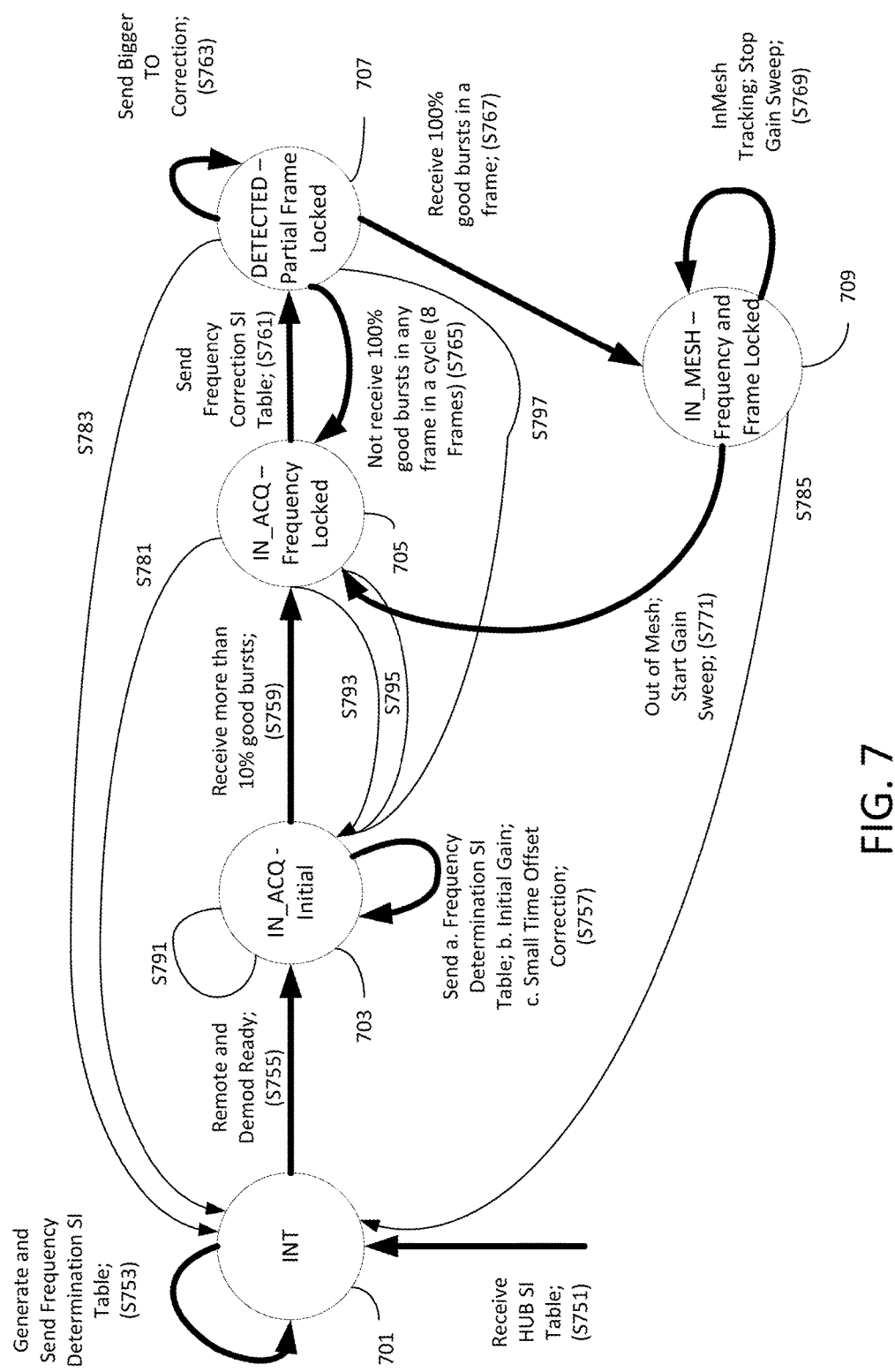
FIG. 7 is a state diagram that illustrates a blind synchronization process according to an exemplary aspect of the disclosure.

FIG. 7 is a state diagram that illustrates a blind synchronization process according to an exemplary aspect of the disclosure. In an exemplary aspect, for a mesh remote terminal to acquire into a mesh network, the Mesh Receiver must obtain information that is comparable to a hub master time reference. And it must do so without any circuitry to recover the hub's PPS and 10 MHz from the NCR messages which the hub broadcasts to all remote sites. In particular, it needs to determine the Gain of the demodulator that is optimal for the signal conditions; determine the Frequency Offset (FO) in the receive path; and determine the SOF Delay to get timing lock with the TDMA Frame. Then, for a mesh terminal to maintain the Lock, it ideally needs to adjust timing, frequency, and power. In an exemplary aspect, the mesh terminal may adjust the SOF Delay at the end of every frame, and may periodically adjust frequency offset, for example, every 10 seconds. To demodulate the Adaptive TDMA (ATDMA) bursts correctly, ULC-R should have a correct options file, as channels need to be configured with the correct center frequency and symbol rate. Also, the SOF should be synchronized with the hub. In an exemplary aspect, BSM 321 operates as part of a state machine that runs on regular intervals, for example, a 1 second interval, where constants used in the machine are configurable, and a default shall be fine-tuned further based on various test results. In one embodiment, a Gain sweep algorithm is enabled only when the BSM 321 is in the ACQUISITION state 703. In an exemplary aspect, the gain sweep algorithm periodically sweeps the gain of the demodulator, for example, every 2 minutes. In an exemplary aspect, each of the demodulators in the multiple demodulators are set for the same gain. In an exemplary aspect, a Frequency Offset correction timer runs only when the ULC-R acquires TDMA frame lock. In an exemplary aspect, the frequency offset is calculated by averaging the Frequency Offset from the TDMA burst headers over the configured time interval.

INT State 701

INT state 701 is an initial state. In an exemplary embodiment, BSM begins running the gain sweep timer every ~(2-6) minutes with step size +/−32, and sets an initial value gain value as 154, and with a range (58-258). The gain sweep timer is periodically run with the predetermined step size to adjust the gain value of the amplifier in the demodulator. Timeout of the gain sweep timer may be computed based on the carrier parameter slot duration. The carrier settings with longer slot duration like Binary Phase Shift Keying (BPSK) or low symbol rate use higher timeout compare to Quadrature Phase Shift Keying (QPSK) or higher symbol rate.

BSM 321 receives the SI table via the remote from the Hub. The SI table is used for frequency determination as follows. First, the channel with highest symbol rate may be picked. Second, the number of channels may be programmed as Max Composite symbol rate (29 Msps)/Symbol rate of the picked channel. In an exemplary aspect, this restriction has been added to avoid the composite symbol rate exceeding the available max 29 Msps. Third, set the frequency offset with step size+/−(0.01*Symbol Rate of picked carrier/100) from the center frequency.

Once both remote (IN_NETWORK) and Demod (Receiving bursts) are ready, the BSM may move to ACQUISITION STATE. If BSM detects either that the remote is not ready or that the Demodulator is not ready (not receiving any bursts), it shall move to INIT state.

Acquisition State 703

At the beginning of the Acquisition State, the BSM 321 starts to analyze the incoming ATDMA bursts frame by frame to detect some good burst (10-20%) in any channel. A good burst is a burst that is received with no CRC error.

Now, BSM 321 may adjust the timing offset (TO) in each frame to see good bursts by assuming that it must receive some good bursts in any of these channels because at least one channel is close to the actual receiving frequency range. BSM 321 may adjust the timing offset of each frame with a predetermined timing offset step size, for example, 0.4*Guard Interval. This is also referred as small timing offset correction, S757. In S759, once the BSM 321 receives a threshold amount of the good bursts (e.g., 10-20%) in a channel, it declares that it has acquired the frequency lock, ACQUISITION Frequency Locked state 705. In the case of more than one channel, BSM 321 may pick the channel that receives the maximum number of bursts. Then BSM 321 may compute the frequency offset from center frequency. Then, in S761, BSM 321 may send a new SI table received from the Hub with frequencies corrected for all channels (Frequency Correction SI table) and move to the DETECTED state 707. The DETECTED state may be considered as being a state that has acquired partial frame lock.

In an exemplary aspect, if the BSM 321 is not receiving any good bursts even after a certain amount of time, for example, after 2 minutes, it assumes that it has swept in time for more than the ACQ slot duration. Then, the Gain may be adjusted to the next higher or next lower setting based on which side the gain is sweeping. In S765, the BSM 321 may declare frequency unlock, which moves the BSM back to ACQUISITION state 703, and sweep for frequency offset in receive path and time. In an example embodiment, the BSM may run the gain sweep in every 2 minutes with step size +/−32, and initial value as follows,

| Modulation | Initial | Min | Max |
|---|---|---|---|
| MdmModulationBpsk | 208 | 122 | 238 |
| MdmModulationQpsk | 184 | 90 | 238 |
| MdmModulationPSK_8 | 58 | 58 | 238 | where, for example, QPSK :- 184, 216, 238, 206, 174, 142, 110, 90, 122, ...

Detected State 707

The BSM 321 may move to DETECTED state 707 when it successively receives a majority of the bursts in a frame, for example 60 percent. Receiving a majority of bursts in a frame is an indication of which side the SOF is aligned, allowing it to make bigger timing correction in order for it to achieve the complete frame lock.

In an exemplary aspect, the BSM 321 may adjust the timing offset to align the start of the frame to see all good bursts in a complete frame, which is called frame lock acquisition. The timing offset may be done using the formula, liming correction=number of missed bursts*slot duration. This may be referred to as bigger timing offset (TO) correction, S763. Once BSM starts getting all good bursts, S767, the BSM 321 moves to IN MESH state 709. In S765, in the case the BSM 321 is not getting any good bursts (for example, bursts that have CRC errors or the demodulator is not able to demodulate bursts), it may move back to ACQUISITION state 705.

BSM 321 may stop the gain sweep once it moves to IN MESH state 709, and restart gain sweep when it goes back to ACQUISITION state 703.

In an exemplary aspect, to stay in mesh, in S769, BSM 321 may track the ULC-R by adjusting both the timing offsets TO per frame and frequency offset FO periodically, for example every 10 seconds. Timing offset correction may be calculated per frame as an average of timing offsets of all good bursts reported in the TDMA burst header. Because of the LO instability on the ULC-R, the local Network Clock Reference (ncr) clock and the TO reported in the TDMA burst header are not accurate. In an exemplary aspect, the BSM 321 may use this local ncr clock value to understand which side the Timing Offset correction has to be applied. Hence, the timing offset correction is limited to a maximum value 34 ncr ticks since the correction is applied every frame. With the correction of about +/−30 to +/−40 ncr ticks a frame, the BSM is capable of staying in IN MESH state 709 for over an extended period of time. This value is based on the observations of the TO reported in Burst Headers and considering the guard_interval.

Frequency offset correction may run using a timer, for example using a 10 second timer, and be calculated based on the average frequency offset of all good ATDMA burst headers. Frequency offset correction may be limited, for example to a maximum of 20000 Hz, to avoid any possible wrong feedback.

If BSM 321 goes out of mesh criteria, in S771, it may move back to ACQUISITION state 705. In an exemplary aspect, out of mesh criteria may be defined as having less than 25% good bursts or when the BSM hits a receive carrier to noise ratio (C/N) below the target C/N.

Figure 8:
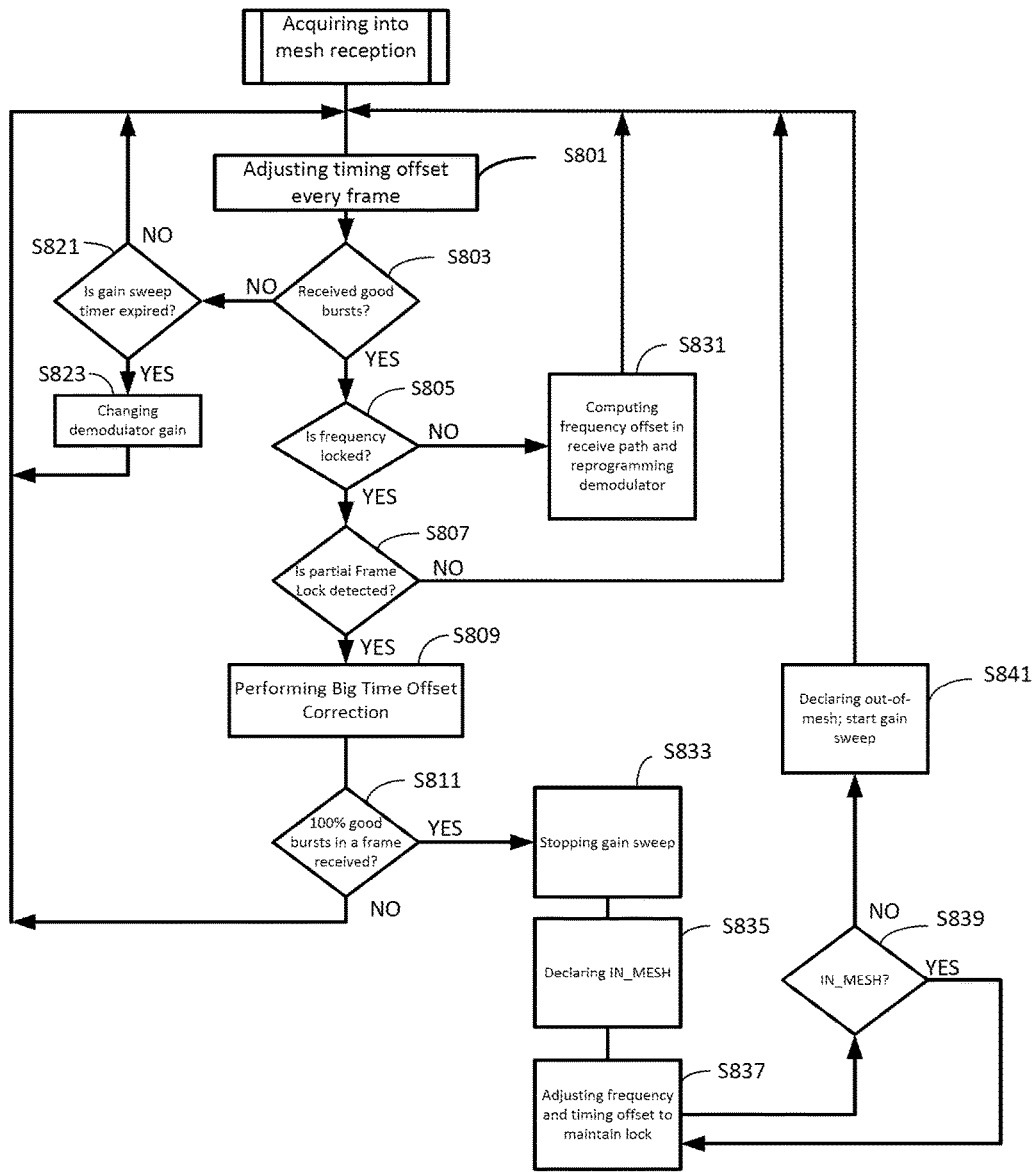
FIG. 8 is a flowchart illustrating the blind synchronization process according to an exemplary aspect of the disclosure.

FIG. 8 is a flowchart for the operation of the mesh receiver to align received mesh transmissions with actual timing of the IP packets. As noted earlier, the mesh receiver must also make adjustments to frequency offset and gain of the demodulator in order to properly receive and demodulate IP packets transmitted over the multiple channels. In an exemplary aspect, IP packets that are not addressed to the mesh receiver may be ignored. In an exemplary aspect, packets that are not addressed to the mesh receiver may be dropped by a packetizer process 325.

Regarding FIG. 8, in S801, if the bursts that are being received by the demodulator do not line up with initial timing, the timing offset of every frame is adjusted by a predetermined amount, for example by a time offset step size of 0.4*Guard Interval. In S803, when the demodulator begins to receive good bursts, e.g., 10 to 20% of a frame (YES in S803), in S805, a decision is made as to whether the frequency is the center frequency of a channel. Good bursts may be defined as bursts that do not contain Cyclic Redundancy Check (CRC) errors. Otherwise, a check is made, in S821, to determine if the gain sweep timer has expired. In an exemplary aspect, gain sweep is performed, e.g., every 2 to 6 minutes, with a step size of +/−32. If gain sweep has expired (YES in S821), the demodulator gain is changed by a predetermined amount, for example by a step size of +/−32. In S805, if frequency is not locked (NO in S805), in S831, the frequency offset in the received path is computed, for example, by calculating the average frequency offset of all good ATDMA bursts, and the demodulator is reprogrammed, i.e., the number of channels are set. In S807, if partial frame lock is detected (YES in S807), in S809, a bigger time offset correction is made. Otherwise, if partial frequency lock not detected (NO in S807), the BSM goes back to S801, and starts over with timing offset adjustment for every frame. After a bit time offset correction is performed in S809, in S811, a check is made as to whether 100% of the bursts are good bursts in a received frame. If all bursts received for a frame are good (YES in S811), in S833, gain sweep is stopped, and in S835, the BSM is IN_MESH. In S837, the frequency and timing offset continue to be adjusted in order to maintain lock. In S839, a decision is made as to whether the BSM is IN_MESH. In the case that the BSM goes out of mesh (NO in S839), in S841, the BSM declares that it is out of mesh, and gain sweep is restarted. Also, the BSM starts over with timing offset adjustment in S901.

Star-Mesh Network Operation

With a star topology network, one-way traffic between the networks behind any two remote sites would require two hops over the air: first from the source remote over the satellite to the hub and second from the hub over the satellite to the destination remote. A mesh topology network eliminates the second hop and allows any two remote sites to communicate directly via satellite, i.e., traffic goes from the source remote to the destination remote directly via satellite in a single hop. In reality, any mesh network is actually a star-mesh network, i.e., remote sites are able to communicate directly with the hub and also directly with other remote sites via satellite. The following paragraphs describe how the various packets are forwarded in this star-mesh network topology.

Figure 9:
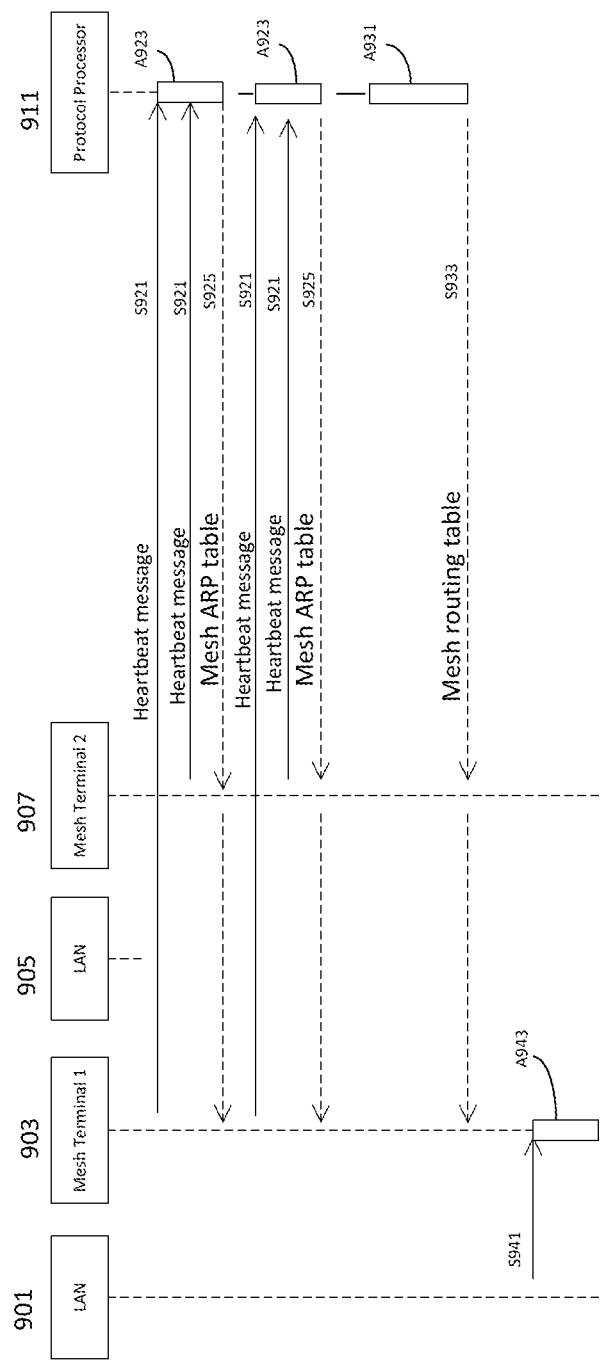
FIG. 9 is a sequence diagram that illustrates establishing a mesh communication according to an exemplary aspect of the disclosure.

FIG. 9 is a sequence diagram illustrating the case where a Mesh terminal declares itself in mesh network communications according to an exemplary aspect of the disclosure. The sequence diagram shows two mesh remote terminals MT1 903 and MT2 907 that seek to transmit data directly via a mesh topology for their respective LAN 901, 905. When a terminal declares itself in mesh network communications, the mesh remote terminal can receive data directly from other mesh terminals in a single hop. In the example shown in FIG. 9, the mesh remote terminal (MT1) 903 periodically sends a heartbeat message, messages S921, to the Protocol Processor 911 with its state information. The state information of the mesh remote terminal (MT1) 903 can be either that the remote terminal is in Mesh network or is in Star network.

In A923, the Protocol Processor 511 builds and maintains a satellite ARP table based on the status reported in the heartbeat messages from various Mesh terminals. In S925, the Protocol Processor 911 periodically sends the ARP table downstream to all the mesh remote terminals (MT1, MT2) in a mesh inroute group.

Additionally, in A931, the Protocol Processor 911 builds a mesh routing table that includes all the routes reachable via mesh remote terminals and, in S933, periodically broadcasts the mesh routing table via the DVB-S2 downstream to all the remote terminals in the mesh inroute group. The mesh remote terminals MT1 903, MT2 907 may receive the satellite ARP table as well as the mesh routing table messages and use those tables to perform route look up and decide on whether to forward traffic in a single hop or double hop.

Figure 10:
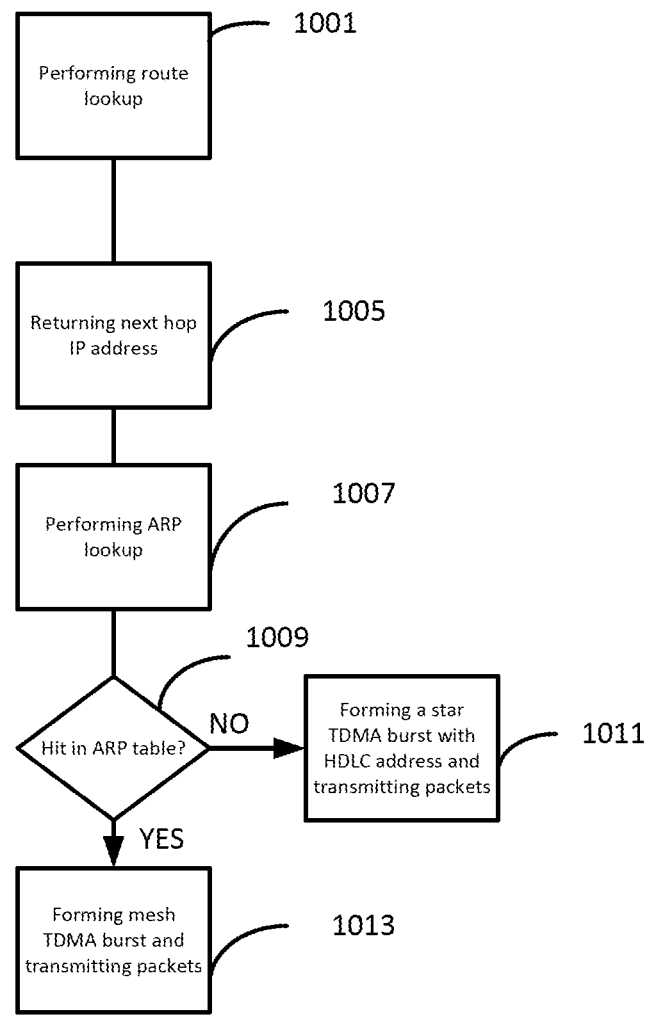
FIG. 10 is a flowchart illustrating a route lookup by the mesh terminal according to an exemplary aspect of the disclosure.

In S941, when a mesh remote terminal 903 (MT1) receives a packet from its LAN 901, in A943, the mesh remote terminal 903 performs a route lookup based on the VLAN and the destination IP address. FIG. 10 is a flowchart illustrating a route lookup by the mesh remote terminal according to an exemplary aspect of the disclosure. In S1001, the mesh remote terminal performs route lookup. If there is a successful match on the mesh routing table entry (YES in S1003), then, in S1005, the route lookup may return the next hop IP address on the VLAN. In S1007, the mesh remote terminal may perform an ARP table look up for the VLAN and the next hop IP address. If there is a match for the satellite ARP table lookup (YES in S1009), then, in S1013, the mesh remote terminal may form a mesh TDMA burst and transmit the packets over the air. The mesh remote terminal that is the next hop in this packets path may receive the TDMA bursts and assemble the packets and forward the packet over its LAN. The hub line cards may also receive the Mesh TDMA bursts. However, the protocol processor may use these bursts to perform Uplink Power Control (UPC) and may drop the mesh TDMA bursts.

If the satellite ARP table lookup returns the HDLC address of the terminal itself (NO in S1009), then, in S1011, the mesh terminal may form a star TDMA burst with source HDLC address only and transmit the packets over the air. All the mesh terminals may drop these bursts and the hub may pick these bursts and forward the data to its appropriate destination.

If a Mesh terminal loses its lock on the TDMA carriers, then the mesh terminal may report this in a heartbeat message to the Protocol Processor with its mesh status as IN network. The Protocol Processor may then remove the Mesh terminal's satellite ARP table entry and flushes any direct routes to the mesh terminal from the mesh routing table. The Protocol Processor may also send an immediate satellite ARP table update message and a mesh route table update message. This may allow all the other mesh remote terminals to forward the traffic to that terminal via the hub in the event that a terminal goes out of mesh.

In an exemplary aspect, when one of the mesh terminals falls out of mesh, the Protocol Processor may forward the packets to the destination terminal via DVB-S2 downstream. Subsequently, in order for a terminal to transmit packets to other mesh terminals directly, both the source and destination terminals need to be in the same Mesh network. That is, both terminals should be receiving the same TDMA carriers.

Figure 11:
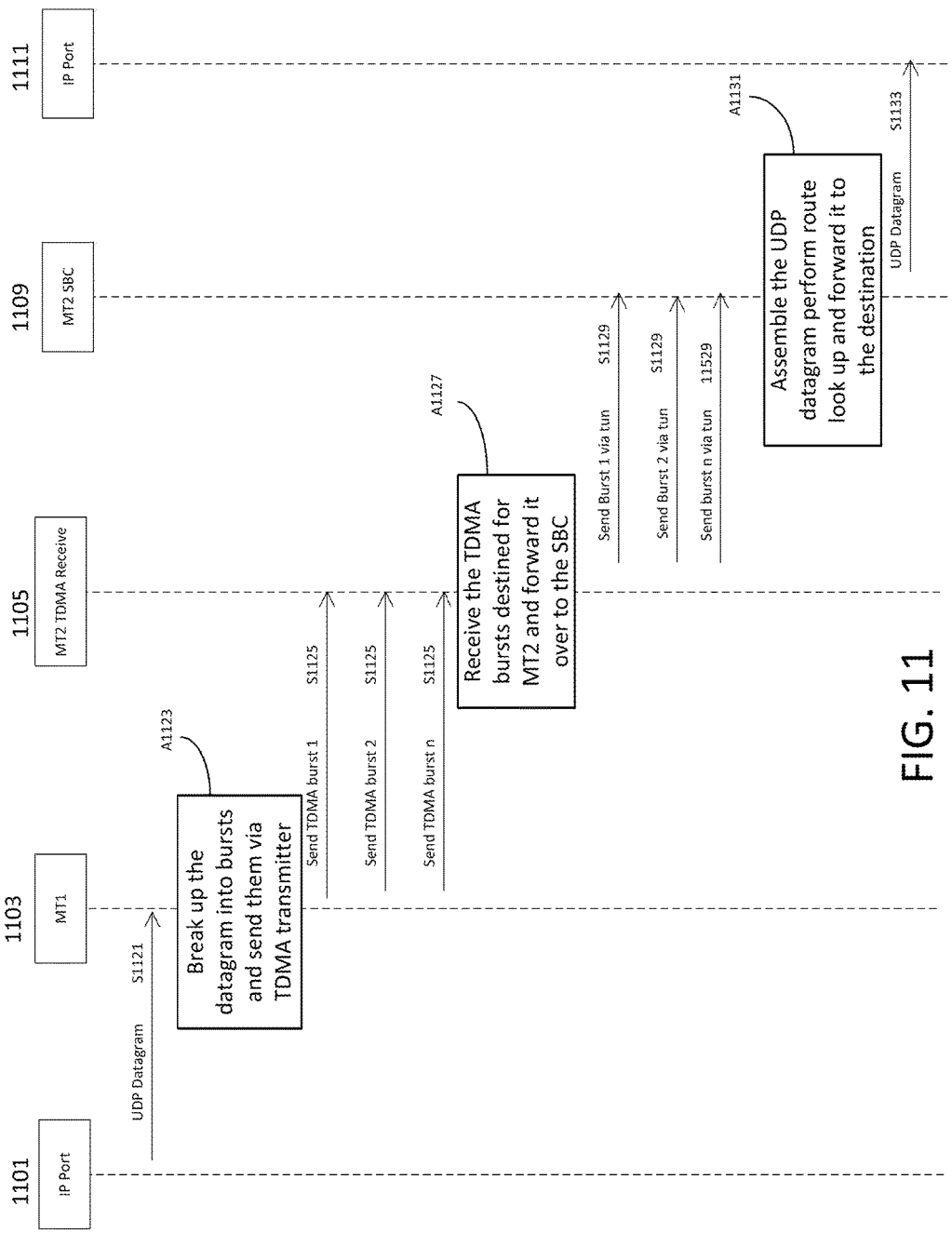
FIG. 11 is a sequence diagram that illustrates mesh communication according to an exemplary aspect of the disclosure.

An example of channel reception in a mesh terminal over a TDMA carrier is shown in FIG. 11. FIG. 11 is a sequence diagram illustrating UDP Datagram flow in mesh network according to an exemplary aspect of the disclosure. The UDP datagram originates from a device on the side of a mesh remote terminal that receives data from the LAN 703 destined to a device within the LAN of the mesh remote terminal. In S1121, the device on the LAN forwards the packet to the default gateway which is MT1 (Mesh Terminal 1103). The mesh terminal 1103 then performs a lookup on the destination and if it finds that the destination is reachable via Mesh network, then, in A1123, MT1 1103 may segment the IP packets into mesh bursts and, in S1125, send them over the TDMA upstream. A mesh burst has source and destination HDLC addresses, and an indication that the addresses are for transmission via a mesh network may be a mesh flag in the first HDLC address. The Protocol Processor (PP) may also receive the mesh TDMA bursts and perform an uplink control process (UCP) using those bursts. However, the PP then drops those bursts without processing them further. In A1127, the ULC-R of MT2 1105 may receive the TDMA bursts and, in S1129, may forward them to the SBC of MT2 1109. In A1131, the SBC 1109 may then assemble the IP packet from the bursts and perform a route look up and, in S1133, send the packet to the remote device via the LAN Port 1111. The remote device, upon receiving the UDP datagram from the SBC, may forward it over to the destination.

A remote terminal that can receive mesh communication may receive multiple channels over multiple frequency carriers. Also, the remote terminal may acquire into mesh communication or fall out of mesh communication depending on its ability to successfully receive TDMA bursts.

Figure 12:
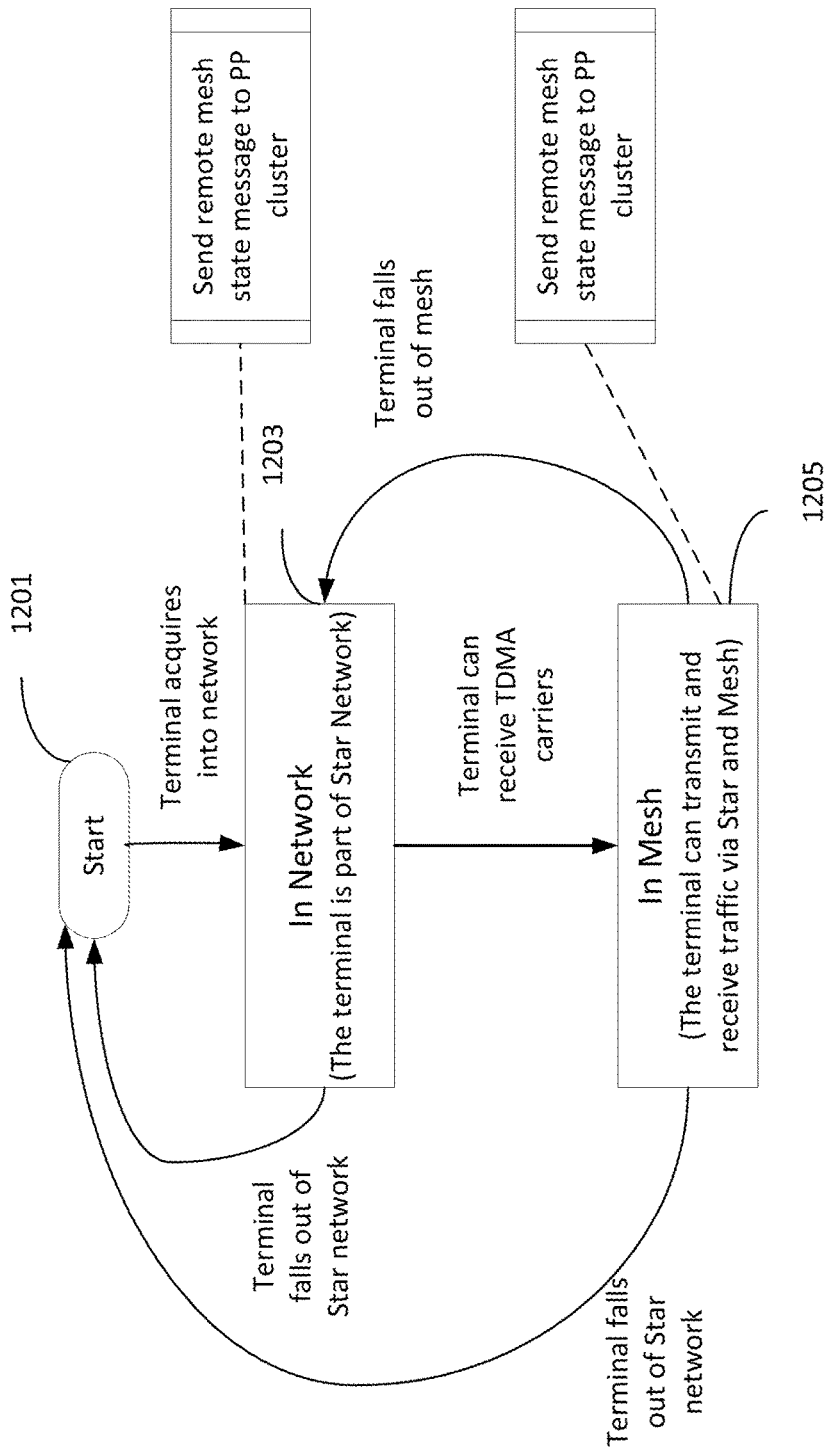
FIG. 12 is a state transition diagram that illustrates state transitions for a mesh remote terminal according to an exemplary aspect of the disclosure.

FIG. 12 is a state transition diagram that illustrates state transitions for a mesh remote terminal according to an exemplary aspect of the disclosure. When remote terminal starts up initially, it marks its Mesh state to be INIT 1201. The remote terminal may then acquire into the star network, in which it informs the PP cluster 133 of its updated state to be IN NETWORK 1203. If the remote terminal changes its configuration to be part of a mesh network, then it may send mesh state message to the PP cluster 133 indicating whether it is IN MESH or not 1205.

A remote terminal may fall out of the network entirely (drop out of communication with the star network) or it may only fall out of mesh (drop out of communication with the mesh network but not the star network). If MT2 falls out of mesh but still manages to stay in the star network, IP packets from MT1 to MT2 may be routed via the Hub. In this case, MT1 may send TDMA bursts without the mesh flag set in the burst. Hence, the packets may be forwarded by the Hub via the DVB-S2 downstream carrier to MT2. This communication flow ensures that, even if a remote terminal falls out of the mesh network, there is connectivity between two remote terminals via the Hub.

Figure 13:
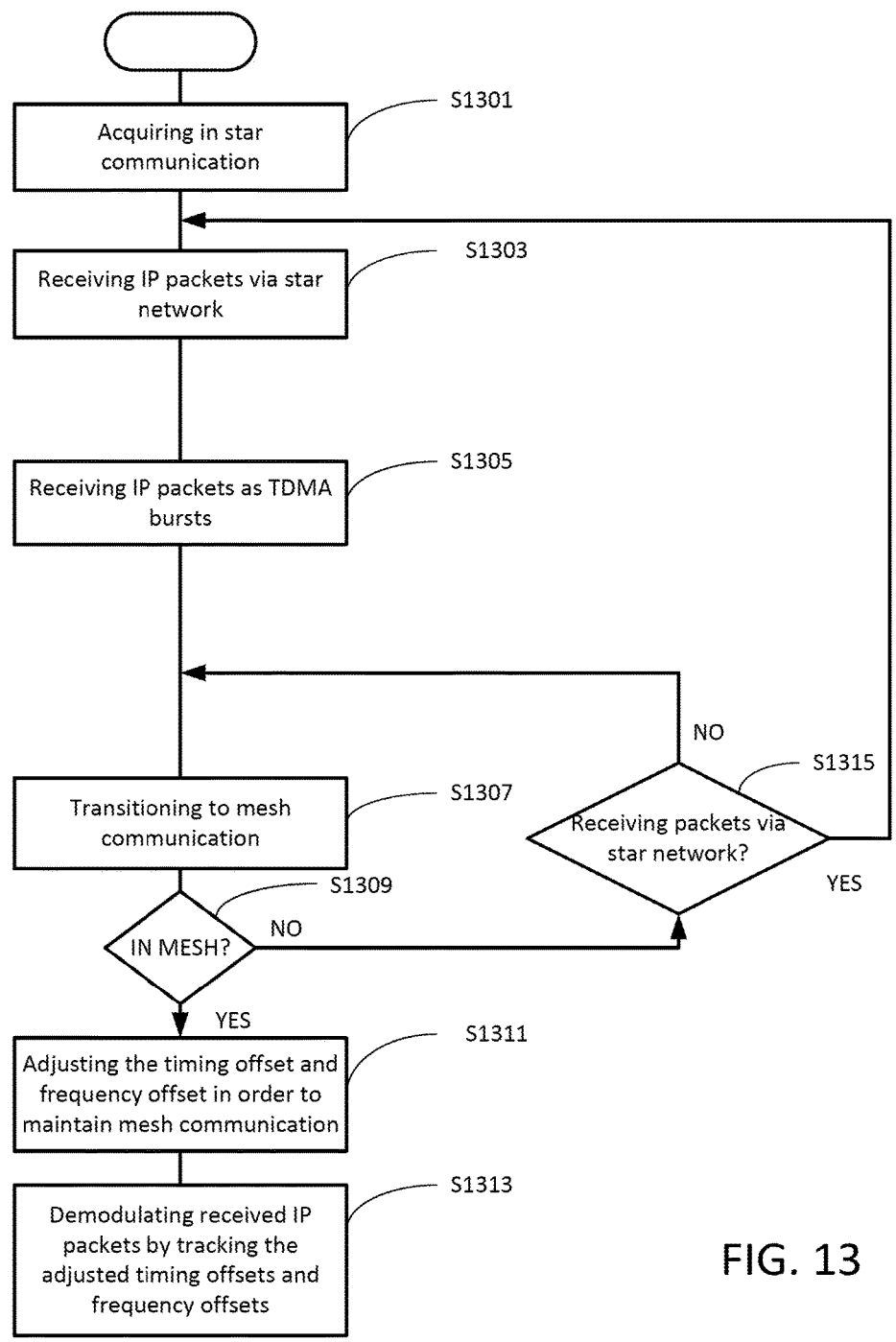
FIG. 13 is a flowchart illustrating an example of IP transmission in the star-mesh VSAT network according to an exemplary aspect of the disclosure.

FIG. 13 is a flowchart illustrating an example of IP transmission in the star-mesh VSAT network according to an exemplary aspect of the disclosure. A star-mesh VSAT network may include several VSAT stations (see 151, 153, 155 in FIG. 1) that communicate with the Internet (101) by way of a centralized hub (103) in a star network topology. Some or all of the VSAT stations may be equipped with a mesh receiver (see 171, 173, 175 in FIG. 1) for communication in a mesh network topology that bypasses communication with the hub. In S1301, a remote terminal of a VSAT station may initially acquire into the star topology network. While in the star network, in S1303, the remote terminal may receive IP packets through DVB-S2 downstream carrier. At some point, another remote terminal in the VSAT network may transmit IP packets as a mesh network transmission. The remote terminal would then, in S1305, receive IP packets as TDMA bursts. In S1307, the remote terminal may begin a process of acquiring into the mesh network to receive the mesh TDMA bursts. If the remote terminal is able to go into the mesh network (YES in S1309), then, in S1311, the remote terminal will adjust the timing offset and frequency offset in order to maintain mesh communication. If a remote terminal remains in a mode of acquiring into the mesh network, or if it falls out of the mesh network (NO in S1309), the remote terminal may instead receive packets over the star topology links (YES in S1315). Otherwise, the remote terminal will continue the process of acquiring into the mesh network (NO in S1315). In S1313, the remote terminal will demodulate received IP packets by tracking the adjusted timing offsets and the frequency offsets.

Managing the Mesh Terminal Locally Via LAN

To manage a remote terminal via the LAN, a user can directly connect a computer to the LAN of remote terminal and give that computer an IP address in the same subnet as the remote terminal's LAN address on VLAN1. A user may also directly connect to the SBC as well as the ULC-R in the same manner. A user may monitor and manage the mesh terminal as long as the computer is connected directly to the mesh terminal and that computer is in VLAN1. The users may then access the web interface on remote terminal to monitor or perform any necessary software or configuration updates locally. The users may also directly connect to SBC as well as ULC-R in the same manner. Users may be able to monitor and manage the SBC or the ULC-R as long as the PC they are using is in VLAN1 and it is connected directly to the SBC or the ULC-R.

The SBC and ULC-R may be managed locally by connecting to the LAN of the Mesh Receiver with a host IP address in the same subnet as the remote terminal's LAN side. The ULC-R may be accessed via the SBC.

The remote terminal and the SBC communicate primarily via UDP datagram sockets. All of the configuration and other messaging occurs via the Tunnel. The SBC communicates with the ULC-R via a tunnel as well. The remote terminal may send status messages to the NMS and the remote terminal can be monitored from the NMS. Version Manager may be used to upgrade various devices that are part of the mesh terminal.

Network Management System

The mesh remote terminal may be configured using a Network Management System (NMS). In one embodiment, the receiving device 221 may receive configuration information from the Network Management System (NMS) in the form of options files. In an exemplary aspect of the disclosure, the configuration for SBC 233 and ULC-R 231 may be defined using keys in the NMS.

In an exemplary aspect, in order to make device identification easier, the Media Access Control (MAC) address of the SBC 233 and ULC-R 231 may be added to the remote device's configuration. When SBC 233 initially starts up, it authenticates itself with the remote device 221 by sending its MAC address in a Hello message. The remote device 221, upon receiving the MAC address, may authenticate the SBC 233. The receiving remote device 221 may then send its configuration to the SBC 233. Similarly, the ULC-R 231 and SBC 233 may exchange their MAC addresses and authenticate each other. SBC 233 may manage the ULC-R's 231 configuration and perform any necessary software upgrades if required. In an exemplary aspect, Version Manager software may be used in upgrading the software on SBC 233 as well as ULC-R 231.

Protocol Processor Software

In a mesh network, the PP has been changed to add a new network/UCP state called 'IN_MESH'. When a remote is IN_NETWORK and it receives an IN_MESH state from its mesh receiver, then the remote moves to 'IN_MESH'. The remote sends this new state periodically to the PP at the hub. When a remote goes out of mesh, it updates out of mesh the same way. This is how the PP learns the new IN_MESH state.

In a mesh network, the PP also adds a new mesh routing table and a satellite Address Resolution Protocol (ARP) table. The PP periodically broadcasts these two tables on the downstream carrier, like the existing routing table. Each remote use these two tables to find the destination HDLC address from the destination IP address of each IP packet.

TX Side OOM (Out-of-Mesh algorithm) has been completely implemented in PP side and remote side, and it shall be discussed in detail in a separated section.

In one implementation, the functions and processes of the SBC 233 may be implemented by a computer 1426. Next, a hardware description of the computer 1426 according to exemplary embodiments is described with reference to FIG.

Figure 14:
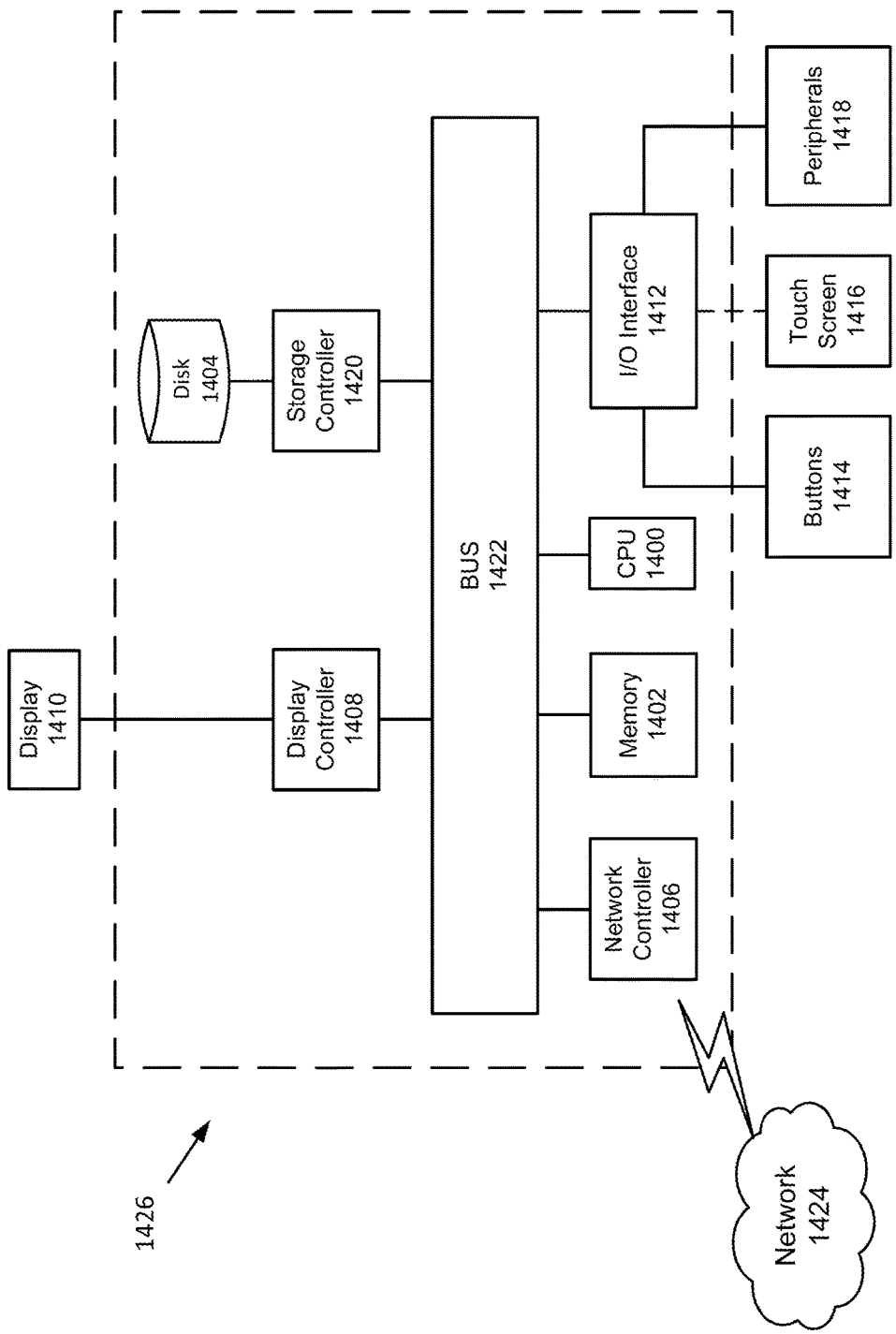
FIG. 14 is a block diagram for a computer system according to an exemplary aspect of the disclosure.

14. In FIG. 14, the computer 1426 includes a CPU 1400 which performs the processes described herein. The process data and instructions may be stored in memory 1402. These processes and instructions may also be stored on a storage medium disk 1404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1426 communicates, such as a server or computer.

Further, the claimed advancements may be provided as a utility application, background daemon, or component of an operating system, or combination thereof, executing in conjunction with CPU 1400 and an operating system such as Microsoft® Windows®, UNIX®, Oracle® Solaris, LINUX®, Apple macOS® and other systems known to those skilled in the art.

In order to achieve the computer 1426, the hardware elements may be realized by various circuitry elements, known to those skilled in the art. For example, CPU 1400 may be a Xenon® or Core® processor or an i7 multi-core processor from Intel Corporation of America or an Opteron® processor from AMD of America, or may be other processor types that would be recognized by one of ordinary skill in the art. Alternatively, the CPU 1400 may be implemented on an FPGA, ASIC, PLD or using discrete logic circuits, as one of ordinary skill in the art would recognize. Further, CPU 1400 may be implemented as a multi-core processor or as multiple processors cooperatively working in parallel to perform the instructions of the inventive processes described above.

The computer 1426 in FIG. 14 also includes a network controller 1406, such as an Intel Ethernet PRO network interface card from Intel Corporation of America, for interfacing with network 1424. As can be appreciated, the network 1424 can be a public network, such as the Internet, or a private network such as LAN or WAN network, or any combination thereof and can also include PSTN or ISDN sub-networks. The network 1424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1426 may optionally include a display controller 1408, such as a NVIDIA® GeForce® GTX or Quadro® graphics adaptor from NVIDIA Corporation of America for interfacing with display 1410, such as a Hewlett Packard® HPL2445w LCD monitor. A general purpose I/O interface 1412 may optionally interface with a keyboard and/or mouse 1414 as well as an optional touch screen panel 1416 on or separate from an optional display 1410. General purpose I/O interface may also connects to a variety of peripherals 1418 including printers and scanners, such as an OfficeJet® or DeskJet® from Hewlett Packard®.

The general purpose storage controller 1420 connects the storage medium disk 1404 with communication bus 1422, which may be an ISA, EISA, VESA, PCI, or similar, for interconnecting all of the components of the computer 1426. A description of the general features and functionality of the display 1410, keyboard and/or mouse 1414, as well as the display controller 1408, storage controller 1420, network controller 1406, and general purpose I/O interface 1412 is omitted herein for brevity as these features are known.

Numerous modifications and variations are possible in light of the above teachings. It is therefore to be understood that within the scope of the appended claims, the invention may be practiced otherwise than as specifically described herein. Thus, the foregoing discussion discloses and describes merely exemplary embodiments of the present invention. As may be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A mesh receiver for a very small aperture terminal (VSAT) that performs communications in a satellite-based network, the mesh receiver comprising:
   a receiver that receives a plurality of TDMA mesh carriers in the network in plural channels, wherein each of the mesh carriers has a frequency offset and a start time that is unknown to the mesh receiver;
   circuitry configured to blindly derive a receiver gain, the frequency offset, and the start time from the received mesh carriers; and
   a demodulator that simultaneously demodulates the received TDMA mesh carriers and generates demodulated bursts for packets of the communications based on the blindly derived gain, frequency offset, and start time.

2. The mesh receiver of claim 1, wherein the frequency offset is a difference between a center frequency of a received TDMA mesh carrier and a center frequency configured on a channel demodulator receiving the mesh carrier, and
   the circuitry is configured to blindly derive the frequency offset based on the difference.

3. The mesh receiver of claim 1, wherein the demodulator includes a plurality of channel demodulators each configured to receive and demodulate one of the plural frequency channels, and the demodulator demodulates the plural frequency channels simultaneously.

4. The mesh receiver of claim 1, wherein:
   the satellite-based network includes a hub and a plurality of other mesh receivers;
   the received TDMA mesh carriers each include a plurality of TDMA bursts, each having an address of a mesh receiver as an intended recipient or an indication that the TDMA burst is intended for the hub; and
   the mesh receiver receives all packets transmitted on the satellite-based network including packets addressed to the mesh receiver and packets addressed to all of the plurality of other mesh receivers and the hub.

5. The mesh receiver of claim 4, wherein the circuitry is configured to ignore the packets addressed to all of the plurality of other mesh receivers and the hub.

6. The mesh receiver of claim 1, wherein the circuitry is configured to blindly derive the receiver gain, the frequency offset, and the start time from the received mesh carriers by determining a gain of an amplifier in the demodulator that meets predetermined signal conditions;
   determining a center frequency of a tuner in the demodulator that meets the predetermined signal conditions; and determining a TDMA burst in a plurality of received TDMA bursts in the received mesh carrier that corresponds to a start time of a frame in the received mesh carrier that enables the demodulator to meet the predetermined signal conditions.

7. The mesh receiver of claim 6, where the predetermined signal conditions are met when the demodulated bursts demodulated by the demodulator have less than a predetermined percentage of cyclic redundancy data validity errors.

8. The mesh receiver of claim 6, wherein the circuitry is further configured to determine the gain by
setting a gain value of the amplifier in the demodulator to an initial value; and
periodically running a gain sweep timer with a predetermined step size to adjust the gain value of the amplifier in the demodulator.

9. The mesh receiver of claim 6, wherein the circuitry is further configured to determine the frequency offset by computing the average frequency offset of all bursts in the received mesh carriers.

10. The mesh receiver of claim 6, wherein the circuitry is further configured to determine the start time of a frame by
analyzing bursts in the received mesh carriers frame by frame to obtain satisfactory bursts, for each channel;
adjusting a timing offset of each frame with a first predetermined time offset step size; and
when a majority percentage of the bursts are properly received in a frame, the start of frame is determined to be aligned and a timing correction greater than the first predetermined timing offset is set for the demodulator in order to align with the timing of the start of the frame.

11. The mesh receiver of claim 9, further comprising circuitry configured to
periodically adjusting both the start of frame time offset and the frequency offset.

12. The mesh receiver of claim 1, wherein the circuitry is further configured to
restart the blindly deriving the gain, frequency offset, and start of frame time when the demodulator fails to demodulate the received mesh carrier according to a second predetermined percent of cyclic redundancy data validity errors.

13. The mesh receiver of claim 1, wherein the satellite-based network includes mesh and star VSAT traffic that is multiplexed onto a common set of carriers, the circuitry receives transmissions over the common set of carriers.

14. A method for performing communications in a satellite-based network that includes a mesh receiver for a very small aperture terminal (VSAT), the method comprising:
receiving a plurality of TDMA mesh carriers in the network in plural channels, wherein each of the mesh carriers has a frequency offset and a start time that is unknown to the mesh receiver;
blindly deriving a receiver gain, the frequency offset, and the start time from the received mesh carriers; and
simultaneously demodulating the received TDMA mesh carriers and generating demodulated bursts for packets of the communications based on the blindly derived gain, frequency offset, and start time.

15. The method of claim 14, wherein the frequency offset is a difference between a center frequency of a received TDMA mesh carrier and a center frequency configured on a channel demodulator receiving the mesh carrier, and
the method further comprises blindly deriving the frequency offset based on the difference.

16. The method of claim 14, wherein the demodulating includes receiving and demodulating one of a plural frequency channels,
wherein the plural frequency channels are demodulated simultaneously.

17. The method of claim 14, wherein:
the satellite-based network includes a hub and a plurality of other mesh receivers, and
the received TDMA mesh carriers each include a plurality of TDMA bursts, each having an address of a mesh receiver as an intended recipient or an indication that the TDMA burst is intended for the hub, the method further comprises
receiving all packets transmitted on the satellite-based network including packets addressed to the mesh receiver and packets addressed to all of the plurality of other mesh receivers and the hub.

18. The method of claim 17, wherein the method further comprising ignoring the packets addressed to all of the plurality of other mesh receivers and the hub.

19. The method of claim 14, wherein the blindly deriving the receiver gain, the frequency offset, and the start time from the received mesh carriers comprises
determining a gain of an amplifier in the demodulator that meets predetermined signal conditions;
determining a center frequency of a tuner in the demodulator that meets the predetermined signal conditions; and
determining a TDMA burst in a plurality of received TDMA bursts in the received mesh carrier that corresponds to a start time of a frame in the received mesh carrier that enables the demodulator to meet the predetermined signal conditions.

20. The method of claim 19, where the predetermined signal conditions are met when the demodulated bursts demodulated by the demodulator have less than a predetermined percentage of cyclic redundancy data validity errors.

21. The method of claim 19, further comprising determining the gain by
setting a gain value of the amplifier in the demodulator to an initial value; and
periodically running a gain sweep timer with a predetermined step size to adjust the gain value of the amplifier in the demodulator.

22. The method of claim 18, further comprising determining the frequency offset by
computing the average frequency offset of all bursts in the received mesh carriers.

23. The method of claim 18, further comprising determining the start time of a frame by
analyzing bursts in the received mesh carriers frame by frame to obtain satisfactory bursts, for each channel;
adjusting a timing offset of each frame with a first predetermined time offset step size; and
when a majority percentage of the bursts are properly received in a frame, the start of frame is determined to be aligned and a timing correction greater than the first predetermined timing offset is set for the demodulator in order to align with the timing of the start of the frame.

24. The method claim 22, further comprising
periodically adjusting both the start of frame time offset and the frequency offset.

25. The method claim 14, further comprising
restarting the blindly deriving the gain, frequency offset, and start of frame time when the received mesh carrier fails to demodulate according to a second predetermined percent of cyclic redundancy data validity errors.

26. The method of claim 14, wherein the satellite-based network includes mesh and star VSAT traffic that is multiplexed onto a common set of carriers, the method further comprising receiving transmissions over the common set of carriers.

27. A non-transitory computer-readable storage medium storing a program, the program when executed by a computer performs communications in a satellite-based network that includes a mesh receiver for a very small aperture terminal (VSAT), the program when executed by the computer comprises:
 receiving a plurality of TDMA mesh carriers in the network in plural channels, wherein each of the mesh carriers has a frequency offset and a start time that is unknown to the mesh receiver;
 blindly deriving a receiver gain, the frequency offset, and the start time from the received mesh carriers; and
 simultaneously demodulating the received TDMA mesh carriers and generating demodulated bursts for packets of the communications based on the blindly derived gain, frequency offset, and start time.

28. The non-transitory computer-readable storage medium of claim 27, wherein the frequency offset is a difference between a center frequency of a received TDMA mesh carrier and a center frequency configured on a channel demodulator receiving the mesh carrier, and
 the program when executed further comprises blindly deriving the frequency offset based on the center frequency.

29. The non-transitory computer-readable storage medium of claim 27, wherein the demodulating includes receiving and demodulating one of a plural frequency channels,
 wherein the plural frequency channels are demodulated simultaneously.

30. The non-transitory computer-readable storage medium of claim 27, wherein:
 the satellite-based network includes a hub and a plurality of other mesh receivers, and
 the received TDMA mesh carriers each include a plurality of TDMA bursts, each having an address of a mesh receiver as an intended recipient or an indication that the TDMA burst is intended for the hub, the program when executed further comprises
 receiving all packets transmitted on the satellite-based network including packets addressed to the mesh receiver and packets addressed to all of the plurality of other mesh receivers and the hub.

31. The non-transitory computer-readable storage medium of claim 30, wherein the program when executed further comprises ignoring the packets addressed to all of the plurality of other mesh receivers and the hub.

32. The non-transitory computer-readable storage medium of claim 27, wherein the blindly deriving the receiver gain, the frequency offset, and the start time from the received mesh carriers comprises
 determining a gain of an amplifier in the demodulator that meets predetermined signal conditions;
 determining a center frequency of a tuner in the demodulator that meets the predetermined signal conditions; and
 determining a TDMA burst in a plurality of received TDMA bursts in the received mesh carrier that corresponds to a start time of a frame in the received mesh carrier that enables the demodulator to meet the predetermined signal conditions.

33. The non-transitory computer-readable storage medium of claim 32, where the predetermined signal conditions are met when the demodulated bursts demodulated by the demodulator have less than a predetermined percentage of cyclic redundancy data validity errors.

34. The non-transitory computer-readable storage medium of claim 32, the program when executed further comprises determining the gain by
 setting a gain value of the amplifier in the demodulator to an initial value; and
 periodically running a gain sweep timer with a predetermined step size to adjust the gain value of the amplifier in the demodulator.

35. The non-transitory computer-readable storage medium of claim 32, the program when executed further comprises determining the frequency offset by
 computing the average frequency offset of all bursts in the received mesh carriers.

36. The non-transitory computer-readable storage medium of claim 32, the program when executed further comprises determining the start time of a frame by
 analyzing bursts in the received mesh carriers frame by frame to obtain satisfactory bursts, for each channel;
 adjusting a timing offset of each frame with a first predetermined time offset step size; and
 when a majority percentage of the bursts are properly received in a frame, the start of frame is determined to be aligned and a timing correction greater than the first predetermined timing offset is set for the demodulator in order to align with the timing of the start of the frame.

37. The non-transitory computer-readable storage medium of claim 35, the program when executed further comprises
 periodically adjusting both the start of frame time offset and the frequency offset.

38. The non-transitory computer-readable storage medium of claim 27, the program when executed further comprises
 restarting the blindly deriving the gain, frequency offset, and start of frame time when the received mesh carrier fails to demodulate according to a second predetermined percent of cyclic redundancy data validity errors.

39. The non-transitory computer-readable medium of claim 27, wherein the satellite-based network includes mesh and star VSAT traffic that is multiplexed onto a common set of carriers, the program when executed further comprises receiving transmissions over the common set of carriers.

\* \* \* \* \*